(12) United States Patent
Carter et al.

(10) Patent No.: US 8,391,663 B2
(45) Date of Patent: Mar. 5, 2013

(54) RACK CABLING SYSTEM

(75) Inventors: Michael R. Carter, McKinney, TX (US); David E. Hildreth, Flower Mound, TX (US); Tyler M. Miller, Lewisville, TX (US); Robert C. Neumann, Plano, TX (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 13/114,928

(22) Filed: May 24, 2011

(65) Prior Publication Data

US 2012/0301083 A1    Nov. 29, 2012

(51) Int. Cl.
*G02B 6/00* (2006.01)

(52) U.S. Cl. .......... 385/134; 385/53; 385/100; 385/101; 385/102; 385/103; 385/104; 385/105; 385/106; 385/107; 385/108; 385/109; 385/110; 385/111; 385/112; 385/113; 385/114; 385/135

(58) Field of Classification Search .......... 385/53, 385/100–114, 134–135
See application file for complete search history.

(56) References Cited

U.S. PATENT DOCUMENTS

| | | | |
|---|---|---|---|
| 6,468,112 B1 * | 10/2002 | Follingstad et al. | 439/719 |
| 6,766,095 B1 | 7/2004 | Bjorklund | |
| 6,918,796 B2 * | 7/2005 | Elliot et al. | 439/719 |
| 7,070,459 B2 * | 7/2006 | Denovich et al. | 439/719 |
| 7,437,048 B2 * | 10/2008 | Farrell et al. | 385/135 |
| 7,555,192 B2 | 6/2009 | Ishii et al. | |
| 7,562,779 B2 * | 7/2009 | Bravo et al. | 211/26 |
| 7,588,373 B1 | 9/2009 | Sato et al. | |
| 8,093,499 B2 * | 1/2012 | Hoffer et al. | 174/72 A |
| 2006/0029354 A1 * | 2/2006 | Follingstad et al. | 385/135 |
| 2010/0141379 A1 | 6/2010 | Tucker | |
| 2010/0296789 A1 * | 11/2010 | Womack et al. | 385/135 |
| 2011/0044598 A1 | 2/2011 | Srutkowski et al. | |

OTHER PUBLICATIONS

CORNING, Corning Cable Systems Optical Cabling Solutions for Brocad, Sep. 2008.

* cited by examiner

*Primary Examiner* — Brian Healy
*Assistant Examiner* — Guy Anderson
(74) *Attorney, Agent, or Firm* — Arnstein & Lehr LLP

(57) ABSTRACT

A rack cabling system including a rack having mounted thereon a first hardware component and a patch panel housing mounted on the rack adjacent the first hardware component. The patch panel housing populates no more than a three rack unit (RU space), the patch panel housing including a front end having cable pathway openings and a rear end having connector coupler plates mounted therein. The patch panel may have a first cable pathway opening located adjacent the first side of the housing and defining a primary position and a first connector coupler plate mounted on the rear adjacent on the first side and the first connector plate having a first position corresponding to the primary position of the first cable pathway opening. Cable harnesses are routed with less than three bends of the cables between the first hardware component and the patch panel housing, so that the first cable harness is terminated at the first coupler plate in the first position.

23 Claims, 17 Drawing Sheets

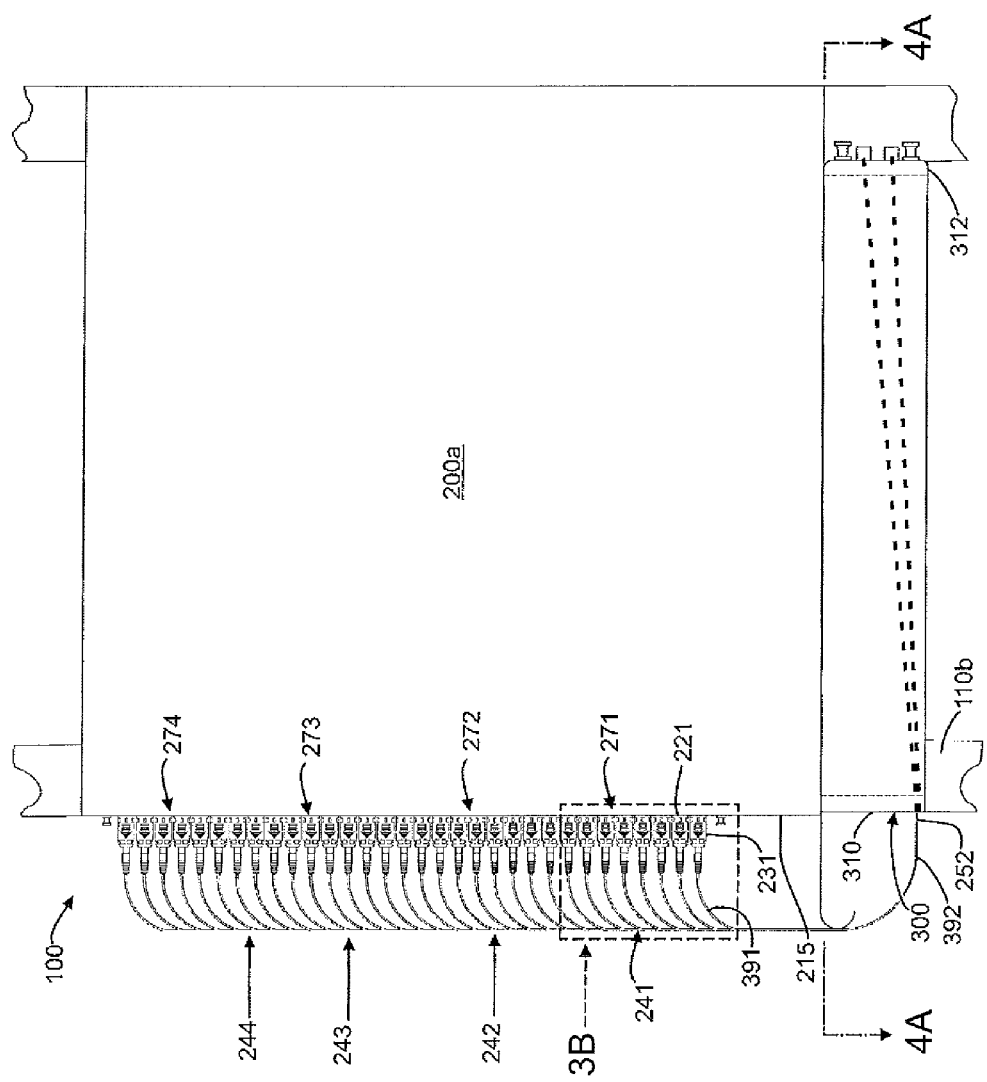

RACK CABLING SYSTEM

The present invention relates to a rack cabling system and provides for an efficient system for attaching and routing cables to components mounted on a rack.

BACKGROUND

Data centers have become very densely populated spaces where multiple components such as switches, routers, directors or servers are interconnected by a multitude of cables. These hardware components are typically mounted on racks so that multiple components may be interconnected using short lengths of cables. Such cables may be fiber optic cables including cable harnesses. Longer jumper cables or trunk cables (multiple fibers enclosed under one jacket) are used for interconnecting equipment within a data center room or to other equipment in a local area network (LAN).

A rack may be used to mount a hardware component described as a blade; due to the small size (thin profile) and high density of the component. For example, a Brocade DCX Fiber Channel Switch, or CISCO 9513 Fiber Channel Switch or like backbone component provides, a 8 Gbps network switching platform for a data center storage area network (SAN) or telecommunications system; including as many as 512 fiber channel ports by combining up to 11 "blades," containing 16-, 32-, 48-, or 64-port fiber channel blades in a single rack chassis.

Such hardware blade components are interconnected by fiber optic cables including terminations at the ends of the cables with fiber optic connectors. For example, individually channeled fiber connectors may be LC type connectors, such as LC Pro-Slide or mSFP-LC-Pro-Slide connectors as described in U.S. Pat. No. 7,588,373. A typical fiber-optic cable harness has multiple individually channeled fiber connectors furcated at a first end and a single cable at a second end terminated by a multi-fiber connector, such as an MTP® connector.

A typical means for handling cables on a rack 10 is depicted in FIG. 1. Fiber-optic cables 15 are routed to or from a distribution shelf 30 from the components below. Since the cables are generally the same length, there is slack in the cables which require that the cables are hanging loosely and may have sharp bends 25 in the cable; which may cause damage to the cables. Although, a sleeve 30 may be used to attempt to contain the cables 15, this organizing means is usually unsuccessful and the cables may fall out of the sleeve 30. Bends 25 in the cables may damage or break the fiber inside the cables and affect the transmission character and the efficiency of the cables. Without a specific cable management system, installation and servicing of such cables is difficult and extremely time consuming.

Other approaches for managing cables include modules or cassettes that may be installed or removed from the front or rear of a patch panel housing. However, the use of such modules requires extra space in the rack. Thus, a cost effective system for managing slack and organization of fiber optic cables within a rack for hardware components is desired to overcome the above problems with previously known systems.

SUMMARY

The present invention provides for a rack cabling system comprising a rack having mounted thereon a first hardware component and a patch panel housing mounted on the rack adjacent the first hardware component. The patch panel housing populates no more than a three rack unit (RU space), the patch panel housing including a front end having cable pathway openings and a rear end having connector coupler plates mounted therein. The patch panel housing is mounted on the rack so that its front end is aligned with a front end of the first hardware component. The cable pathway openings are arranged within the patch panel housing between a first side and second side of the housing, the patch panel having a first cable pathway opening located adjacent the first side of the housing and defining a primary position and a first connector coupler plate mounted on the rear adjacent on the first side and the first connector plate having a first position corresponding to the primary position of the first cable pathway opening and a second position adjacent the first position. The first hardware component having a first cable harness extending therefrom, each harness including a group of individually channeled fiber connectors terminating on a group of cables at a first end of the harness and a multi-fiber connector at an opposite second end of the harness. The group of cables at the first end, each have different lengths and each cable is progressively longer with respect to an adjacent cable at the first end of the harness.

A hardware component having at least a first and second cable harness extending therefrom, the hardware blade component having a first and second area for connecting the first end of each cable harness. The first cable harness has its first end mounted to the first hardware blade component in the first area on the component and the second end received in the primary position of the patch panel, so that the first cable harness is routed with the three bends or less of the cables from the first hardware blade component into the first cable pathway opening and extending without a bend through the patch panel housing so that the multi-fiber connector is terminated at the first connector coupler plate in the first position.

The second cable harness is routed with three bends or less of the cables from the second area of the hardware component into the cable pathway opening of the patch panel and extends without a bend through the patch panel housing to the rear end so that the multi fiber connector is terminated at the second position of the connector coupler plate offset from the first position and the length of each of the cables comprising the second cable harness being longer than each of the cables comprising the first cable harness wherein a minimum amount of slack is provided in each of the first and second cable harnesses.

In an embodiment, the patch panel may include at least eight cable pathway openings and each numbered sequentially 1-8. In an embodiment, the patch panel may include at least eight connector coupler plates. In an embodiment, the connector coupler plates may include up to eight couplers on each plate and each coupler numbered sequentially, 1-8. In an embodiment, the second cable harness multi-fiber connector is terminated in a second position at a coupler numbered "2".

In an embodiment, each of the first and second cable harnesses may include the first end having up to twelve individually channeled LC type connectors terminated on up to twelve individual cables forming the group of cables at the first end and each harness including the second end having up to twelve individual cables to form a multi-fiber cable terminated with a MTP type connector. The multi-fiber connector and the multi-fiber cable are furcated to provide up to twelve individual cables at the first end of the harness. In an embodiment, the LC type connector may comprise an LC of a standard LC, Pro-Slide or mSFP-LC Pro-Slide connector. In an embodiment, the first and second hardware component may each include up to twelve fiber optic connectors for mating with up to twelve individually channeled LC type connectors at the first end of the cable harness. In an embodiment, at least four cable harnesses may be routed from each plate component and each cable harnesses having a length of 36" up to 90," respectively and the first end of each harness of up to twelve individual cables staggered by a difference in length of ½ "connector to connector with a tolerance of approximately ¼" to ½".

In an embodiment, the bend of the first and second cable harness may comprise a change of direction of the second end of the harness of more than 5° in any continuous arc of the cable comprising a single bend, until the cable runs in a straight path for at least three inches and then changes direction to begin a second bend. The rack may include trunk cables attached to couplers on coupler plates on the patch panel housing and a horizontal trunk management bar for managing the trunk cables. The rack may include a second hardware component each of the first and second hardware components being mounted in a vertical orientation within the rack. In an embodiment, each of the first and second cable harnesses extend downward from the first hardware component and the second end of each cable harness may form approximately a radiused 90° bend in order to enter the front end of the patch panel housing so that the first and second cable harnesses are received in the first cable pathway opening "1".

In an embodiment, the rack may include a second hardware component, each of the first and second hardware components being mounted in a horizontal orientation within the rack. Each of the first and second cable harnesses may extend sideways from the first hardware blade component toward a first side of the rack, a third cable harness may extend from the second hardware blade component sideways toward the first side of the rack, the third cable harness having a first and second end, each of the first ends of the first, second and third cable harnesses forming approximately a radiused 90° bend in order to extend downward along the first side of the rack and the second end of each of the first, second and third cable harnesses forming approximately a radiused 90° bend in order to enter the front end of the patch panel housing so that the first and second cable harnesses are received in the first cable pathway opening numbered "1." In an embodiment the first cable pathway opening may receive up to eight cable harnesses. In an embodiment, the third cable harness routed from the second hardware component is received in a second cable pathway opening numbered "2." The first hardware component including a blade including one of a switch, router, director, data management tool and server.

A further embodiment of the invention provides for a rack cabling system comprising a rack having mounted thereon a first hardware component and second hardware component and second hardware component, a patch panel housing mounted on the rack adjacent the first hardware component, the patch panel housing populating no more than a three rack unit (RU) space, the patch panel housing having a front and having cable pathway openings and a rear end having connector coupler plates mounted therein, the patch panel housing mounted in the rack so that its front end is aligned with a front end of the first and second hardware blade components. The cable pathway openings are arranged within the patch panel housing between a first side and second side of the housing, the patch panel having a first cable pathway opening located adjacent the first side of the housing and defining a primary position and a first connector coupler plate mounted on the rear end adjacent the first side and in the primary position corresponding to the first cable pathway opening and the patch panel housing having a second cable pathway opening. The first hardware component has a first cable harness bundle extending therefrom, the second hardware component having a second cable harness bundle extending therefrom, each of the first and second cable harness bundles having at least two harnesses each comprising a group of individually channeled fiber connectors terminating on a group of cables at a first end and a multi-fiber connector at an opposite second end.

The first cable harness bundle has its first end mounted to the first hardware blade component and the second ends received in the primary position of the patch panel so that the first cable harness bundle is routed with three bends or less of the cables from the first hardware blade component into the first cable pathway opening and extending without a bend through the patch panel housing to the rear end so that the multi-fiber connectors are terminated at the first connector coupler plate.

The second cable harness bundle is routed with three bends or less of the cables from the second hardware blade component into the second cable pathway opening offset from the primary position of the patch panel and extending without a bend through the patch panel housing to the rear end so that the multi-fiber connectors are terminated at a second connector coupler plate off-set from a primary position and the length of each of the cables comprising the second cable harness bundle being longer than each of the cables comprising the first cable harness bundle wherein a minimum amount of slack is provided in each of the first and second cable harness bundles.

In an embodiment, each of the first and second hardware blade components may be mounted in a horizontal orientation within the rack. Each of the first and second cable harness bundles may extend sideways from the first and second hardware blade component, respectively toward a first side of the rack and each of the first ends of the first and second cable harness bundles forming an approximately radiused 90° bend in order to extend downward along the first side of the rack and the second end of each of the first and second cable harness bundles forming an approximately radiused 90° bend in order to enter the front end of the patch panel housing so that the first cable harness bundle is received in the first cable pathway opening numbered "1" and the second cable harness bundle is received in a second cable pathway opening numbered "2".

In an embodiment, the first cable harness bundle may comprise at up to twelve individual cables having up to twelve individually channeled fiber connectors at a first end extending from a first area of the first hardware blade component and a second end from which up to twelve individual cables are furcated. The second cable harness bundle may comprise at least up to twelve individual cables having up to twelve individually channeled fiber connectors at a first end extending from a first area of the second hardware blade component and a second end from which up to twelve individual cables are furcated.

In an embodiment, the first cable harness bundle further comprises at least up to twelve individual cables having up to twelve individually channeled fiber connectors at a first end extending from a second area of the first hardware blade component and a second end from which up to twelve individual cables are furcated. The second cable harness bundle may further comprise at least up to twelve individually channeled fiber connectors at a first end extending from a second area of the second hardware blade component and a second end in which the second up to twelve individual cables are furcated.

The present invention further comprises a method of assembling cabling for a rack of hardware blade components comprising the steps of assembling a rack having first and second hardware blade components, locating no more than a three rack unit (RU) space on the rack and mounting a patch panel housing thereto, the patch panel housing having a front and having a cable pathway opening in a rear end having connector coupling plates, or entering the patch panel on the rack so that the front end is aligned with a front end of the first hardware blade component and a primary position of the cable pathway opening is oriented in accordance with the position with the first hardware blade component, attaching a first end of a first cable harness to the first hardware blade component, routing a second end of the first cable harness to the cable pathway opening of the patch panel housing with three or less bends of the first cable harness, routing the second end of the first cable harness through the patch panel housing to the rear end, terminating the second end of first cable harness at the coupler plate, attaching a first end of the second cable harness to the second hardware blade component, routing a second end of the second cable harness channel opening of the patch panel housing with three or less bends of the second cable harness, routing the second end of the second cable harness through the patch panel housing to the rear end in a position adjacent to the primary position and terminating the second end of the second cable harness at the second coupler plate.

BRIEF DESCRIPTION OF THE DRAWINGS

The invention may be more completely understood in consideration of the following description of various embodiments of the invention in connection with the accompanying drawings, in which:

FIG. 3a is a side elevation view of the rack system of FIG. 1;

FIG. 3b is an enlarged view of a first end of a cable harness assembly from an isolated area marked 3b depicted in FIG. 3a;

FIG. 6b is a perspective enlarged view of a rack system similar to the rack system FIG. 6a;

FIG. 7 is a side elevation view of the rack of FIG. 6a;

FIG. 8b is an enlarged plan view of the first end of a cable harness assembly from an isolated area marked 8b depicted in FIG. 8a;

FIG. 10 is a rear elevation view of the rack of FIG. 6a.

Figure 1:
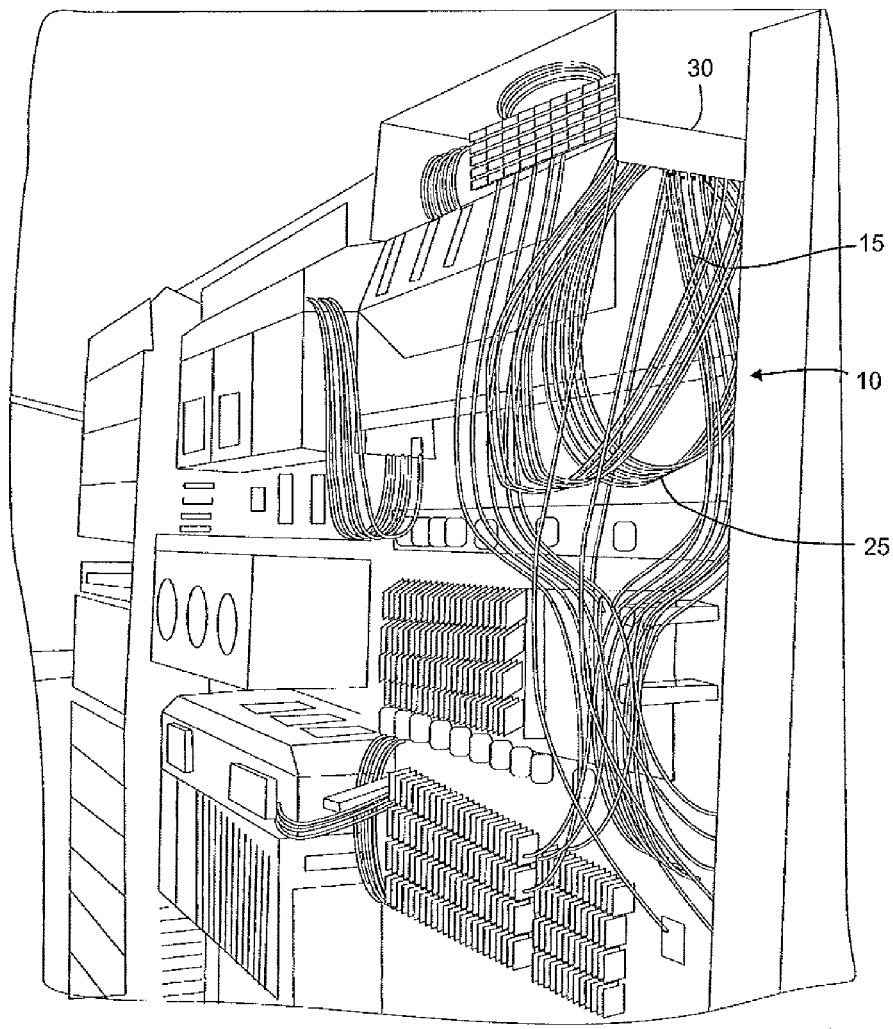
FIG. 1 is a perspective view of a rack system of the prior art.

While the invention is amendable to various modifications and alternate forms, specific embodiments have been shown by way of example in the drawings and will be described in detail, it should be understood that the intention is not to limit the invention to the particular embodiments described. The intention is to cover all modifications, equivalents and alternatives falling within the spirit and the scope of the invention.

DETAILED DESCRIPTION

Figure 2:
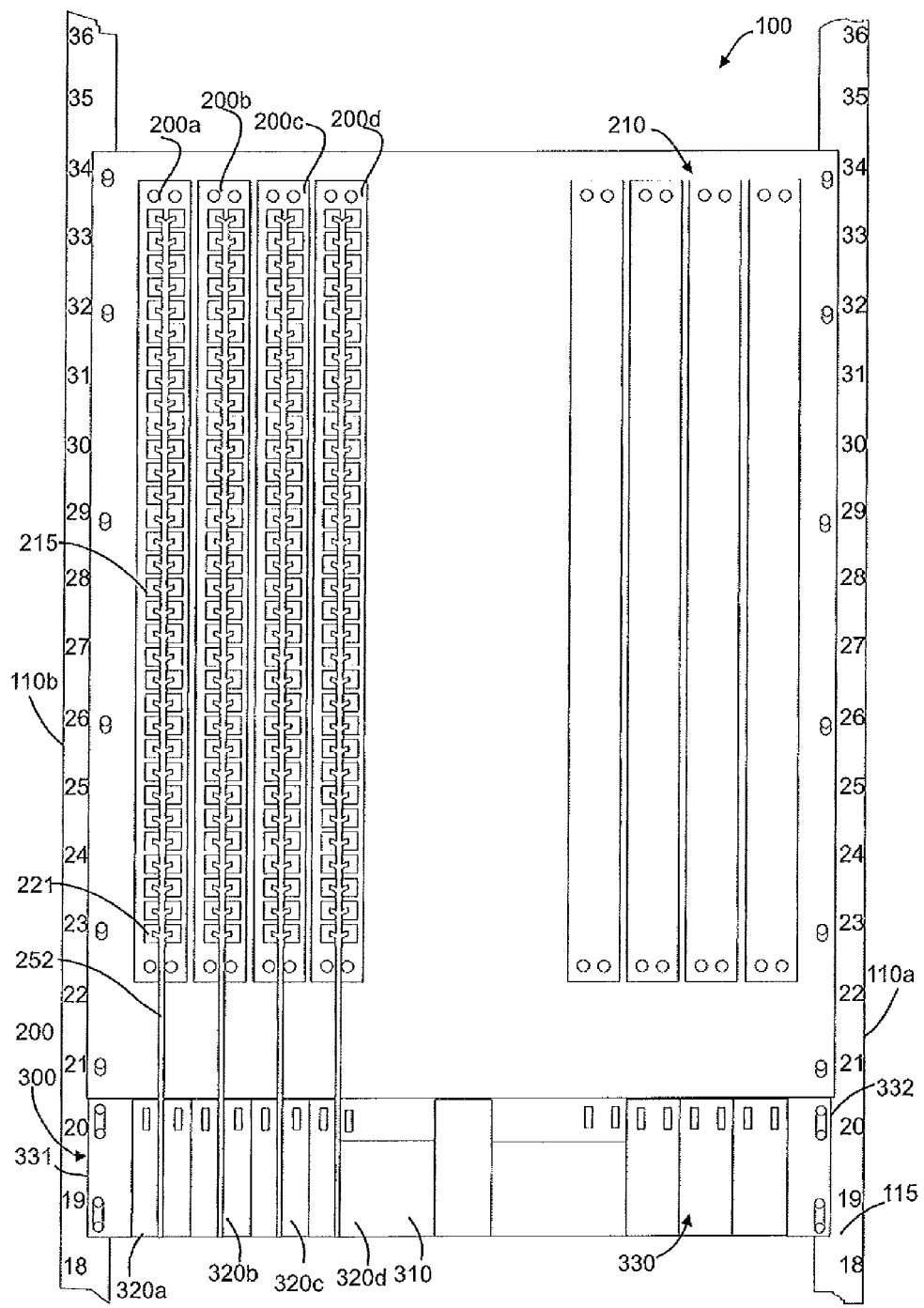
FIG. 2 is a front elevation view of a rack system of the present invention.

The present invention will be described with respect two embodiments, however it is to be understood that the invention may be used in other alternate embodiments not depicted specifically in this description. The two embodiments involve a rack having a hardware blade component in 1) a vertical orientation and 2) a horizontal orientation. The first embodiment of the invention having the hardware blade component mounted in a vertical orientation will be described with respect to FIGS. 2-5. A rack 100 is provided, as is known in the data center industry having side rails 110a, 110b formed by metal C-channels and bracket and shelving components mounted between the rails. The rails 110a, b include indicia 115, such as numeric markings for indicating the positioning of components on the rack by, for example in inches. Such markings can aid in determining the rack unit (RU space) the components mounted on the rack populate. The partial rack 100 as shown in FIG. 2, is 31.5" tall, however, an additional chassis or equipment may be stacked above this chassis or a single rack may be provided that is at least twice as high as the rack depicted in FIG. 2.

The chassis 200 is populated with hardware blade components 200a-x. First hardware blade component 200a has a first side and a second side each with thirty-two ports, the second hardware blade component 200b has a first side and a second side each with thirty-two ports, the third hardware component 200c and fourth hardware component 200d have two parallel rows of thirty-two ports. The hardware components 200a, b, c, d are operational and have cabling and connectors mounted thereto. Other hardware components 210 are also provided in the rack 100 (FIG. 2), but are not presently operational and do not have cabling or connectors mounted thereto.

The hardware blade component 200 may include a switch, router, director or server. For example, a Brocade DCX FC8-64 high density Fiber Channel Switch blade or DCX FC8-48 mounted in a DCX or DCX-4s chassis, or CISCO 9513 Fiber Channel Switch may operate appropriately with the cabling system of the present invention. As depicted, each of the hardware blade components 200a, b, c, d have thirty-two ports/channels on each side that populate a front of each hardware blade component 200 with a total of sixty-four ports per component 200. However, the present invention may be applicable to any high density hardware component simply by changing the channel count on the corresponding harness.

Figure 3B:
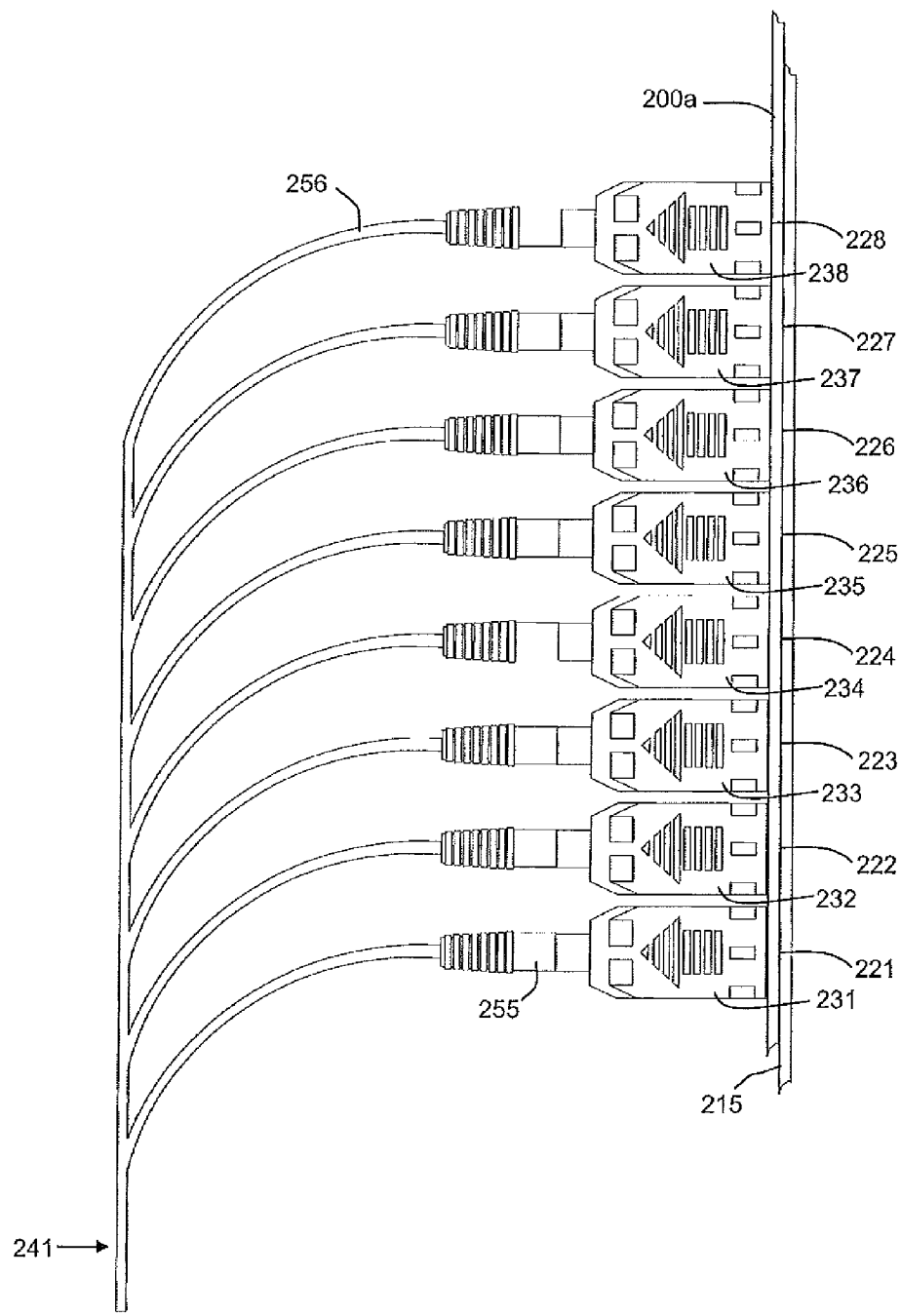

Each port 221 inside blade receives a fiber optic connector, such as an individually channeled fiber connector 231. As depicted in FIG. 3a, a first individually channeled fiber connector 231 is mounted in port 221 on the front end 215 of the hardware blade component 200a in a first position. FIG. 3b is an enlarged view of the first eight connectors 231-238 mounted on the front end 215 of the hardware blade component 200a. In alternate embodiments there may be between up to twelve connectors and up to twelve corresponding ports and cables. In the embodiment depicted in FIG. 3b, the group of eight connectors 231-238 comprise a cable harness 241.

Figure 3C:
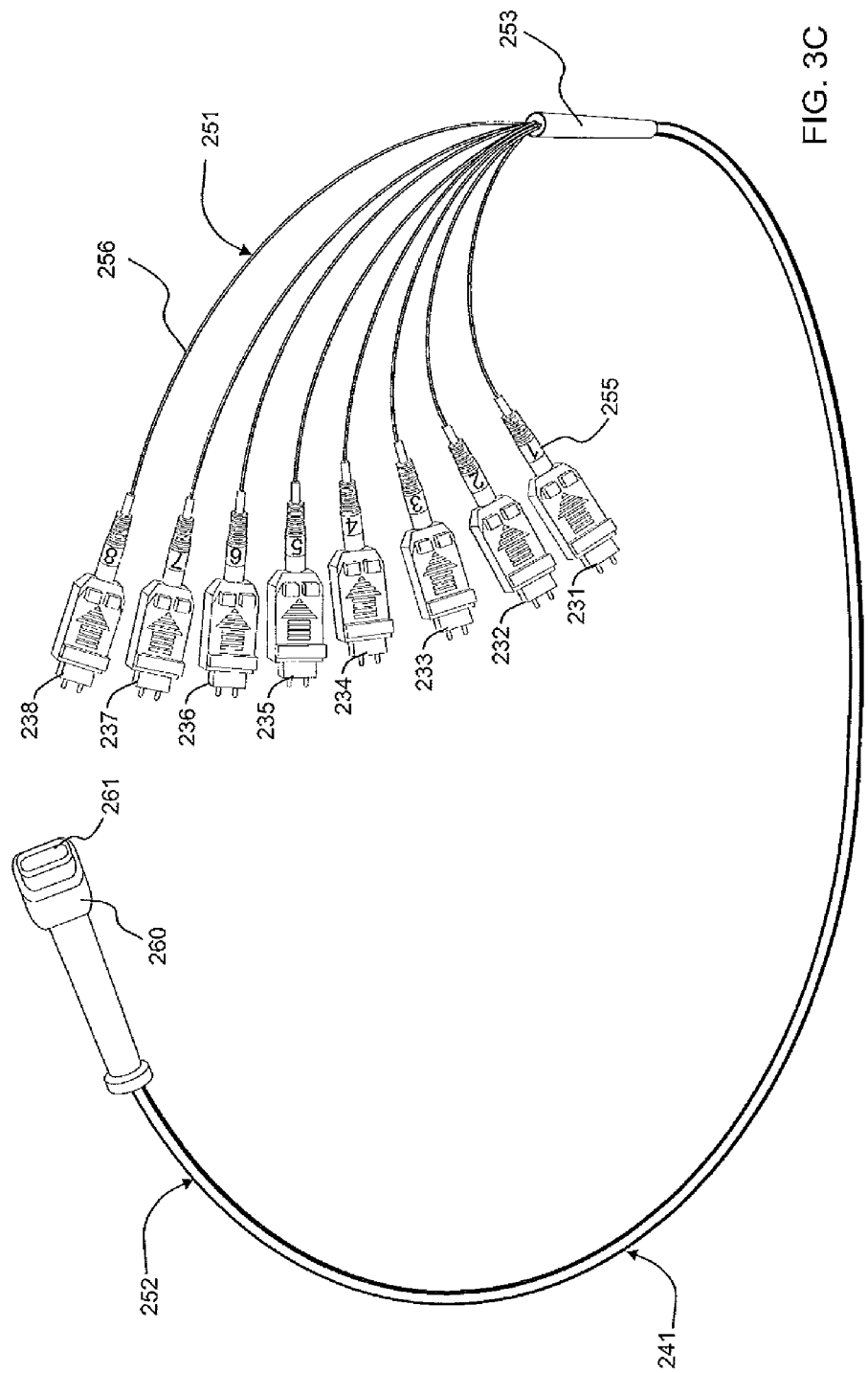
FIG. 3c is an enlarged view of an entire loose cable harness.

An example of an entire harness, prior to connection to the rack system 100 is depicted in FIG. 3c. In an embodiment, the individual channel fiber optic connector may be an LC duplex type connector such an LC or mSFP/LC Pro-Slide connector. As depicted in FIG. 3a, cable harness assemblies 241, 242, 243 and 244 are aligned along the length of the blade 200a, so that a total of thirty-two connectors 231 are mated to the ports 221 at the front end of the hardware blade component 200a. It is to be understood that while the embodiment depicted in these drawings includes eight connectors 231 in each harness 241-244, the present invention may comprise cable harnesses which have more or less connectors and individual cables 256 in each harness. In addition, it is to be well understood that a hardware component having more or less than sixty-four ports may be accommodated by the present invention and cable harnesses having varying numbers of connectors 231 and cables 256.

It is to be understood that FIG. 3a depicts one side of the hardware blade component 200a and only depicts the thirty-two ports 221 and connectors 231 running vertically along the first side of the blade 200a and there are correspondingly thirty-two other ports on the other side of the hardware blade component 200a for receiving an additional thirty-two fiber optic connectors to make a total of sixty-four ports (and connectors) per blade component 200.

As shown in FIG. 3c, the harness 241 has a first end 251 including individual fiber cables 256 attached to each of the eight fiber optic connectors 231-238 and a second end 252 to which a multi-fiber connector 260 is attached. In an embodiment, a multi-fiber connector 260 may be used such as an MTP connector. Such connectors include a ferrule 261 which can accommodate up to twenty-four optical fibers. In the cable harness 241, it is to be understood that the eight optical connectors 231-238 are terminated with the multi-fiber connector 260 so that only sixteen optical fibers are populated in the ferrule 261. It is to be understood that the cable harness can have up to four more fiber optic connectors attached at the first end 251 without having to modify the MTP connector 260. In other embodiments, other multi-fiber connectors may be used to increase or decrease the amount of optical fibers in order to provide for different size cable harnesses depending on the number of ports 221 in the hardware blade component 200a to be populated.

The cable harness 241 has the second end 252 which is furcated at furcation point 253 in order to provide the eight individual cables at the first end 251. Finally each individual cable is terminated with a connector 231-238. Each connector 231-238 may have a boot 255. Each boot 255 may be numbered 1-8, in order to help the operator keep the fanned-out first end 251 of the harness 241 organized (FIG. 3c). As depicted in FIG. 3b, the first connector 231 will be mated in the first port 221 (and will have the numeral "1" on the boot 255) and the second connector 232 is mated to second port 222 (and will have the numeral "2" on its boot 255) etc.

As can be seen in FIG. 3c, the first end 251 of each individual cable is progressively longer for each connector 231-238. For example, the individual cable at the first end 251 for the eighth connector 238 will be approximately about ½" longer than its adjacent connector 237 etc. It may be understood that the first end 251 of the individual cable to which the eighth connector 238 is terminated will be approximately 4" longer than the individual cable at the first end 251 to which the first connector 231 is terminated. Due to the custom assembly of these cable harnesses, a ¼" to 1" tolerance can be maintained. As will be discussed in more detail later, the staggering of the lengths of the first end 251 of the fanned-out cables on each cable harness 241-244 and a narrow tolerance range allows for the orderly connection of the harness to each hardware blade component 200a and eliminates slack and provides for a neat and organized cabling system.

Turning again to FIG. 3a, the staggered lengths of each of the adjacent cables for the first cable harness 241 is shown mated to the hardware blade component 200a in a orderly fashion. It may be understood that the first connector 231 is closer to the second end 252 of the harness assembly 241 and therefore its cable can be shorter than the cable 256 for the eighth connector 228, further along the length of the front end 215 of the hardware blade component 200a, eight channels away (FIG. 3b). The first cable harness 241 has its connectors 231 mated to the hardware blade component 200a at a first area 271 having eight ports 221; the second harness assembly 242 has its connectors mated to the hardware blade component 200a at a second area 272 having eight ports; the third cable harness 243 has its eight connectors mounted to the hardware blade component 200a at a third area 273 having eight ports and the fourth cable harness 244 has its eight connectors mated to the hardware blade component 200a at a fourth area 274 having eight ports provided. It may be understood in other embodiments, that the hardware blade component areas 271, 272, 273 and 274 may have varying numbers of ports depending on the grouping of the number of connectors 231 terminated on each cable harness 241, 242, 243, 244. In addition, hardware blade component areas may by located on the multiple hardware blade components.

Mounted in the rack 100, is a patch panel housing 300 having a front end 310 and rear end 312 (FIG. 3a). The patch panel housing 300 is mounted in the rack 100 so that the front end 310 is adjacent the front end 215 of each of the hardware blade component 200a, b, c, d. The patch panel housing 300 includes a first cable pathway opening 320a, a second cable pathway opening 320b, a third cable pathway opening 320c and a fourth cable pathway opening 320d (FIG. 2). Other cable pathway openings 330 are also provided in the patch panel housing 300. The first cable pathway opening 320a is the primary position located adjacent the first side 331 of the patch panel housing 300. In an embodiment, the front end 310 of the patch panel housing 300 includes indicia marked thereon to help an operator locate the proper pathway openings 330. For example, the front end 310 may be numbered "1" to "8" from left to right as oriented in FIG. 2. The numeral "1" identifies the first cable pathway opening 320a, numeral "2" designates the second cable pathway opening 320b, etc.

In an embodiment, the front end 310 may include two sets of routing indicia to allow a single patch panel housing 300 to be used in different rack configurations. For example, the front end 310 may have a first set of routing indicia being numbered "1" to "8" from left to right in a first color and the front end 310 may have a second set of routing indicia being numbered "1" to "8" from right to left in a second color as oriented in FIG. 2. The first set of indicia, for example, may be used by an operator in the condition discussed above when the hardware component 200 is mounted vertically in the rack 100 and the primary position "1" corresponds with cable pathway opening 320a on the left side of the patch panel 300. The second set of indicia may be used by an operator in a condition discussed below with respect to FIGS. 6a-10, when the hardware component is mounted horizontally in the rack and the primary position "1" correspond with a cable pathway opening on the right side of the patch panel. Having dual routing indicia on the front end 310 allows a single model of the patch panel housing 300 to be mounted in a rack, whether it will be populated at a later time with either horizontally or vertically oriented hardware components.

Figure 4A:
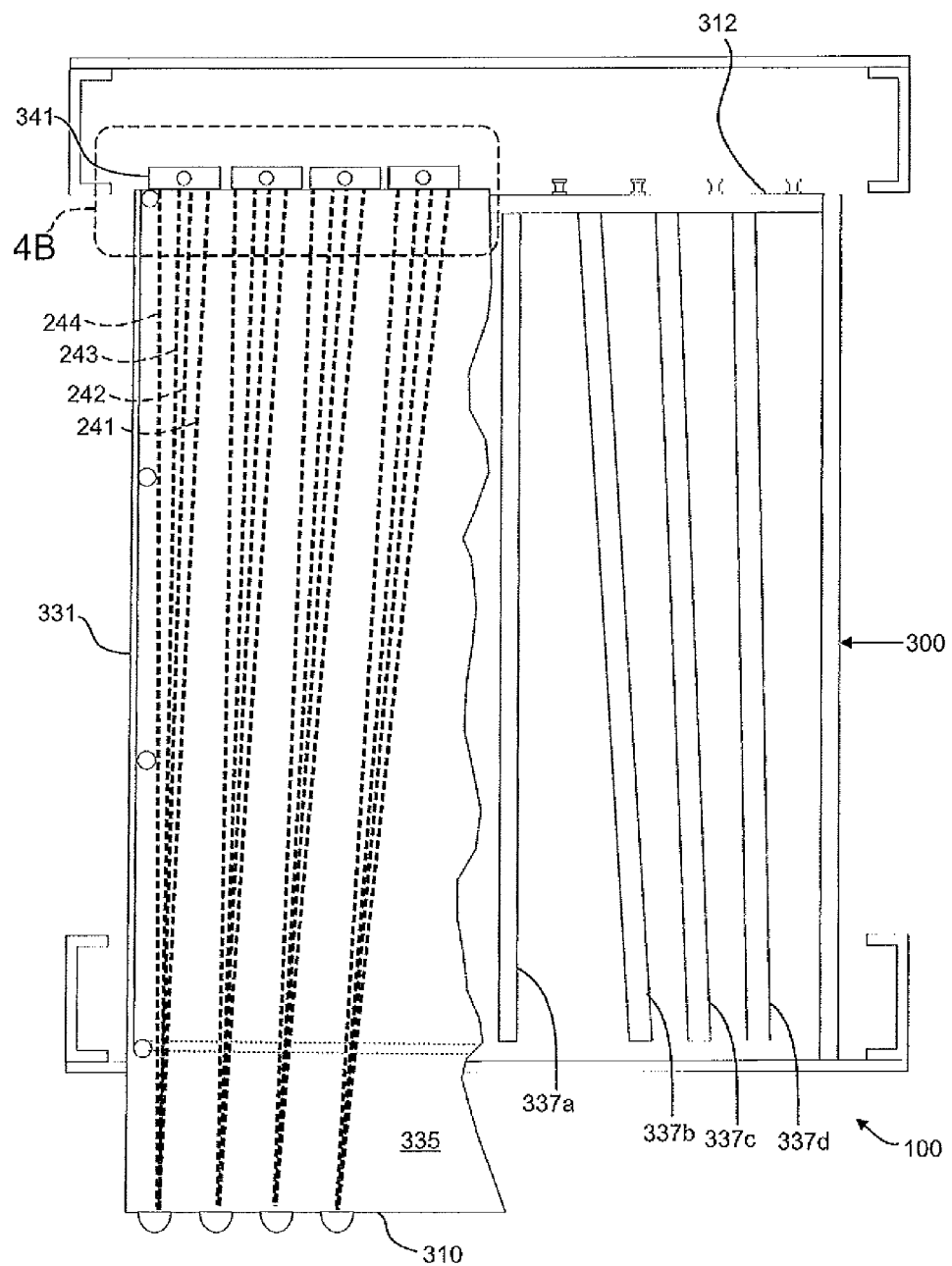
FIG. 4a is a section view taken at line 4a-4a of FIG. 3a depicting a patch panel mounted on the rack.

FIG. 4a is a section view of the rack 100 taken at line 4a-4a from FIG. 3a and depicts a plan view of the patch panel housing 300 partially broken away. As viewed in FIG. 4a on the left side the housing cover 135 is depicted. The housing cover 335 on the right of the drawing FIG. 4a has been removed and depicts the interior of the patch panel housing 300 exposing a view of the interior walls 337a, b, c, d that provide harness pathways inside the housing 300. Similar walls 337 are provided on the other side of the interior of the housing 300.

Figure 4B:
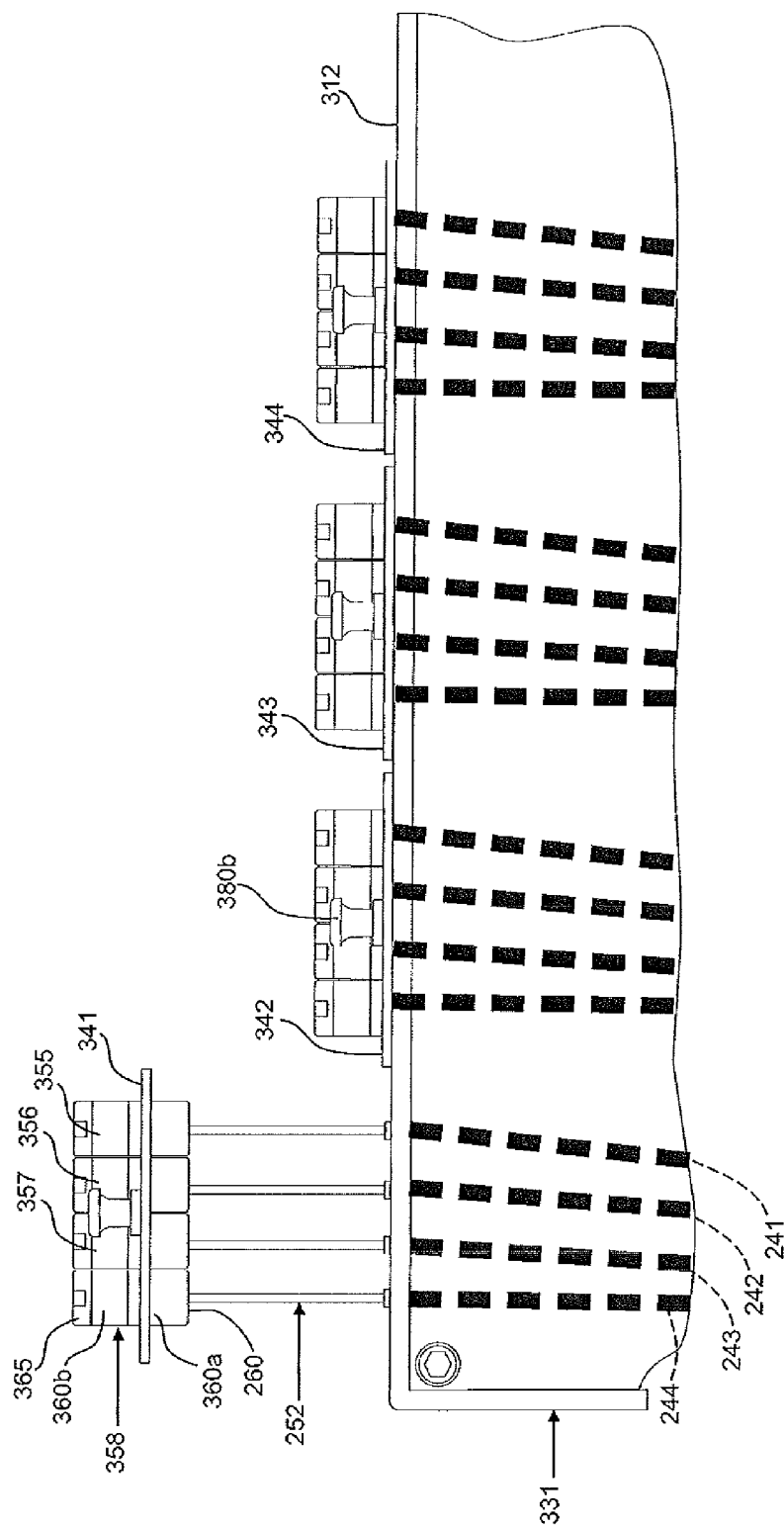
FIG. 4b is an enlarged view of an isolated area marked 4b of the rear end of the patch panel of FIG. 4a depicting an exploded view of a coupler plate.
Figure 4C:
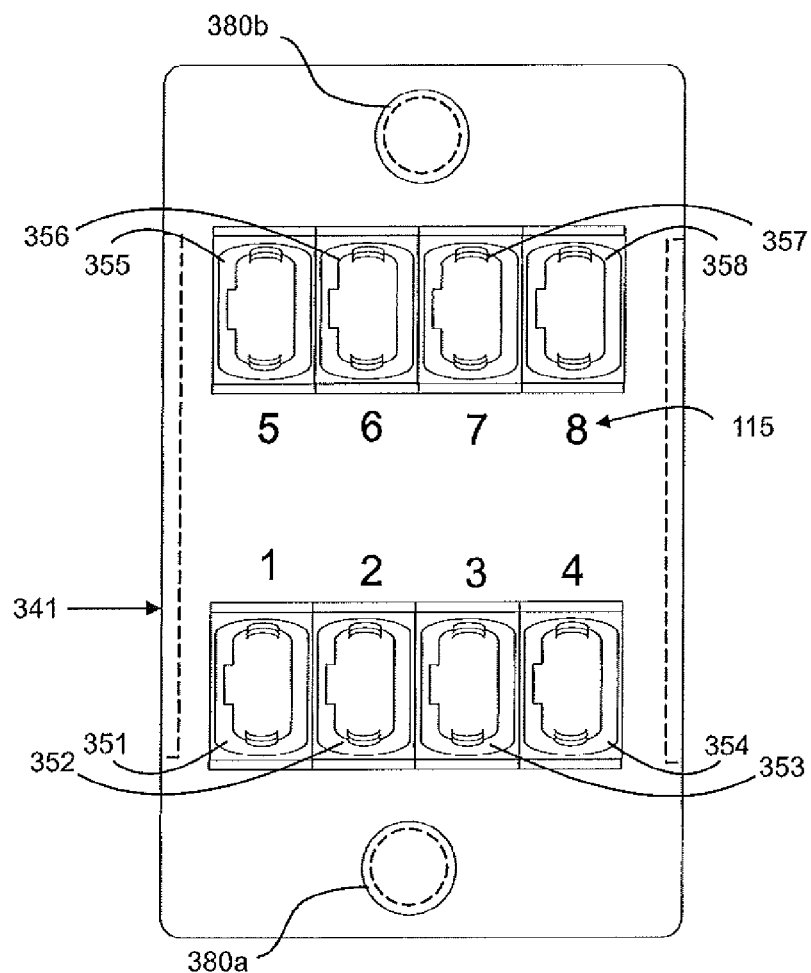
FIG. 4c is an enlarged plan view of one of the coupler plates of FIG. 4b.
Figure 5:
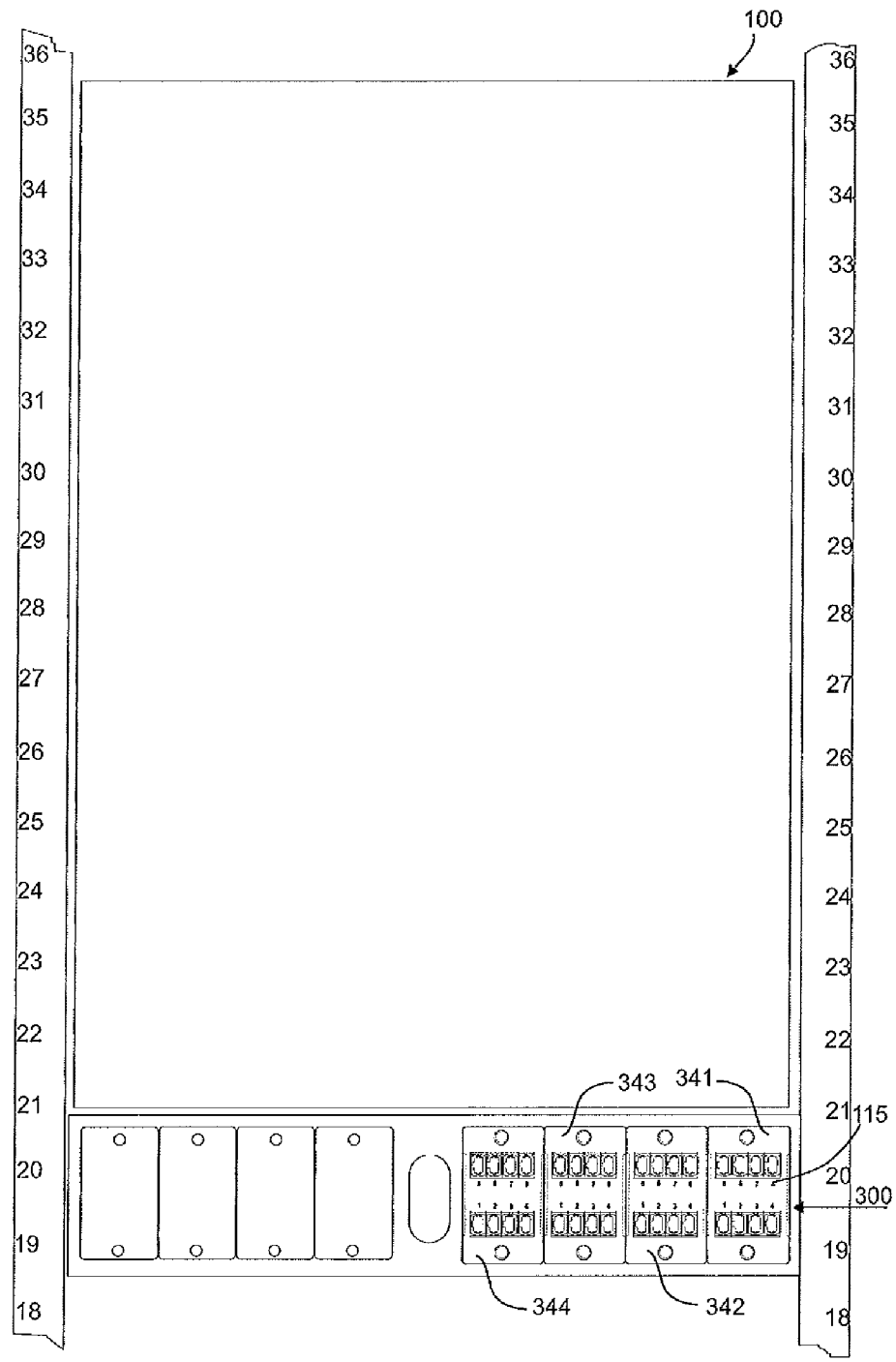
FIG. 5 is a rear elevation view of the rack of FIG. 2.

The rear end 312 of the housing 300 has mounted thereon a first connector coupler plate 341, a second connector coupler 342, a third connector coupler 343 and a fourth connector coupler plate 344 (FIG. 4b). Each coupler plate 341 includes eight coupler connectors 351-358 (FIG. 4c). Each coupler connector 351-358 includes an internal facing side 360a for receiving a multi-fiber connector 260 and an external facing side 360b (FIG. 4b) for receiving a jumper cable connector (not shown). As depicted in FIGS. 4b and 4c, each coupler connector 351-358 has a dust cover 365 mounted thereto. As depicted in FIG. 4c, the coupler plate has indicia 115 provided thereon which identify the positions of the connector couplings 351-358. As shown in FIG. 4c, numerals 1-8 are provided to designate the positioning of the coupler connectors 351-358. Thus it is understood that the primary position is the coupler connector with numeral "1" in the lower left position, as shown in FIG. 4c. This is the position in which connector coupler 351 is mounted on the plate 341. As will be discussed in more detail, the first cable harness 241 includes multi-fiber connector 260 which is terminated at the primary position on the coupler plate 341 at connector coupler 351.

To understand the invention further, the steps of mounting and routing the cables on the rack 100 will be discussed in sequence. The first cable harness 241 is arranged so that the first end 251 has each of the connectors 231-238 fanned-out, so that the first connector 231 may be inserted in the first port 221 on the first hardware blade component 200a in a first position (FIG. 3a, b). Each of the next connectors 232-238 are likewise mated to its corresponding port 222-228 in the first area 271 on the hardware blade component 200a. The second end 252 of the cable harness 241 is allowed to dangle downward towards the ground while the next step is completed. The second cable harness 242 is then arranged so that its first end is fanned-out, so that each of the eight connectors may be mated to the second area 272 of the hardware blade component 200a. Likewise, the second end 252 of the second cable harness 242 is allowed to dangle downward toward the bottom of the rack 100. The third cable harness 243 is organized so that the eight connectors at the first end 25 may be sequentially mated at the third area 273 on the hardware blade component 200a. The second end 252 of the third cable harness 243 is dangled downward toward the bottom of the rack 100. Finally, the fourth cable harness 244 has each of its eight connectors at the first end mated to the fourth area 274 at each of the ports therein on the hardware blade component 200a.

Thus, it is understood that each of the second ends 252 of the cable harnesses 241, 242, 243 and 244 are each lying side by side in a vertical orientation as shown in FIG. 2 (single line 252 is representative of multiple harnesses 241, 242, 243, 244). In the embodiment depicted in FIG. 2, the cable harnesses 241-244 will have a total length of between 36" and 90." The length of the cable harness may vary depending on the specific hardware component and port configuration. Thus, it may be understood that when the second ends 252 of each of the cable harness 244 assemblies 241-244 are allowed to dangle downward, each of the multi-fiber connectors 260 will be side-by-side, since the positioning of each cable harness is higher along the length of the vertically oriented hardware blade component 200 from the first area 241 to the fourth area 244.

Each of the second ends 252 of the cable harnesses 241-244 are routed through the cable pathway openings 320 at the front end 310 of the patch panel housing 300. A tool may by used to pull each individual multi-fiber connector 260 from the front end 310 to the rear end 312 of the patch panel housing 300. In a preferred embodiment, the first cable harness 241 is routed through the first cable pathway opening 320a and the multi-fiber connector 260 terminated at position "1" on the coupler plate 341. Then the second end 252 of the second cable harness 242 is routed through the first cable pathway opening 320a and its multi-fiber connector 260 is terminated in position "2" on the coupler plate 341 adjacent the primary position where the first cable harness has its connector 260 terminated to coupler connector 351. Then the second end 252 of the third connector cable harness 243 is routed through the first cable pathway opening 320a and its connector 260 mated to the coupler connector 353 on the first coupler plate 341. Finally, the second end 252 of the fourth cable harness 244 is routed through the first cable pathway opening 320a and its multi-fiber connector 260 mated to the fourth coupler connector 354 on the first coupler plate 341.

As depicted in FIG. 4b, it is preferable to remove the coupler plate 341 from the rear end 312 of the patch panel housing 300 to attach the multi-fiber connector 260 to its corresponding coupler connector 351-354. Once each of the connectors 260 are mated to the coupler plate 341 the plate is mounted to the rear end 312 of the housing 300 via snap fit fasteners 380a, 380b (FIG. 4c). In an alternate embodiment, fasteners may be used, such as screws or other types of hardware. According to the orientation of the preferred embodiment of the hardware blade component 200a having thirty-two channels on a single side; the use of only four cable harnesses 241-244 is necessary coming from the first hardware blade component 200a. In that instance, only four cable harnesses are routed through the first channel opening 320a and likewise and only the first four positions and coupler connectors 351-354 are used on the coupler plate 341.

However, it is to be understood that a hardware blade component 200a having more channels will require additional cable harnesses and in that instance there are non-populated coupler connectors 351-358 (FIG. 4B, 4C) on first coupler plate 341 (and additional coupler plates 342-344) to accommodate additional multi-fiber connectors 260 that are routed from the additional cable harnesses.

The assembly of the rack 100 would continue in a similar way with respect to the second hardware blade component 200b and the second ends of each of the four harness assemblies are be routed through the second cable pathway opening 320b and each of its multi-fiber connectors 260 is terminated at the second coupler plate 342. Likewise the cable harnesses for the third hardware blade component 200c is routed through the third cable pathway opening 320c and the multi-fiber connector 260 of each of those cable harnesses is terminated at coupler plate 343. The cable harnesses extending from the fourth hardware blade component 200d is routed through the fourth cable pathway opening 320d and each of the multi-fiber connectors 260 is terminated at the fourth coupler plate 344 at the rear 312 patch panel housing 300. If there were additional hardware blade components being used on the rack 100 the assembly of the cabling to the rack 100 would continue moving from first side 331 towards the second side 332 of the patch panel housing 300 and routing the corresponding cable harnesses through each of the additional cable openings 330 similar as discussed above.

In assembling the cables to the rack 100 in this manner, each of the cable harnesses 241-244 has a first radiused 90° bend 391 when the first end 251 is routed from the front end 215 of the hardware blade component and a second radiused 90° bend 392 (FIG. 3*a*) when the second end 252 of the harness is routed into the channel openings 320 *a, b, c, d*. A bend of the cable harness comprises a change in direction of the second end 252 of the harness of more than five degrees and any continuous arc of the cable comprising a single bend until the cable runs in a straight path for at least three inches and then changes direction to begin a second bend.

The routing of the second ends 252 of the cable harnesses from the front end 310 to the rear end 312 of the patch panel housing 300 is done in a straight line, so that there are no bends. Since the length of the second ends 252 are carefully tailored to the size of the patch panel housing 300 and with respect to the orientation on the rack with relation to each of the hardware blade components populated thereon, so there is little slack and minimum bending of the cables on the rack 100. The rack system 100 limits the severity and number of bends of the cables in and helps to maintain transmitted power and avoids micro-bends and macro-bends. Also due to the structured orientation of the cabling 241-244 from the first area 271 of the patch panel housing 300 to the primary position 351 on the coupler plate 341 and the ordered assembly of the routing of cables 241-244 in a sequential orientation, there is little slack in each of the cable harnesses 241-244; which provides for an organized and orderly rack cabling system. The orderly and organized system as described above also allows for a more rapid assembly of the cables 241-244 to the rack system 100.

As well due to the minimal bends of the cable harnesses 241-244 the fiber optic cable are well maintained, have increased longevity and maintain high performance. Finally, due to the organizational structure of the patch panel housing 300 having each of the separated cable pathway openings 320, divider walls 337 and the housings orientation where the cable pathway openings 320 are oriented at the front end 310 being adjacent to the front end 215 of the hardware blade component 200*a* and terminating at the rear end 312, provides for a patch panel housing 300 that takes up a minimal amount of space. For example, as depicted in FIG. 2, it can be seen that the patch panel housing 300 takes a two (RU) space.

Figure 6A:
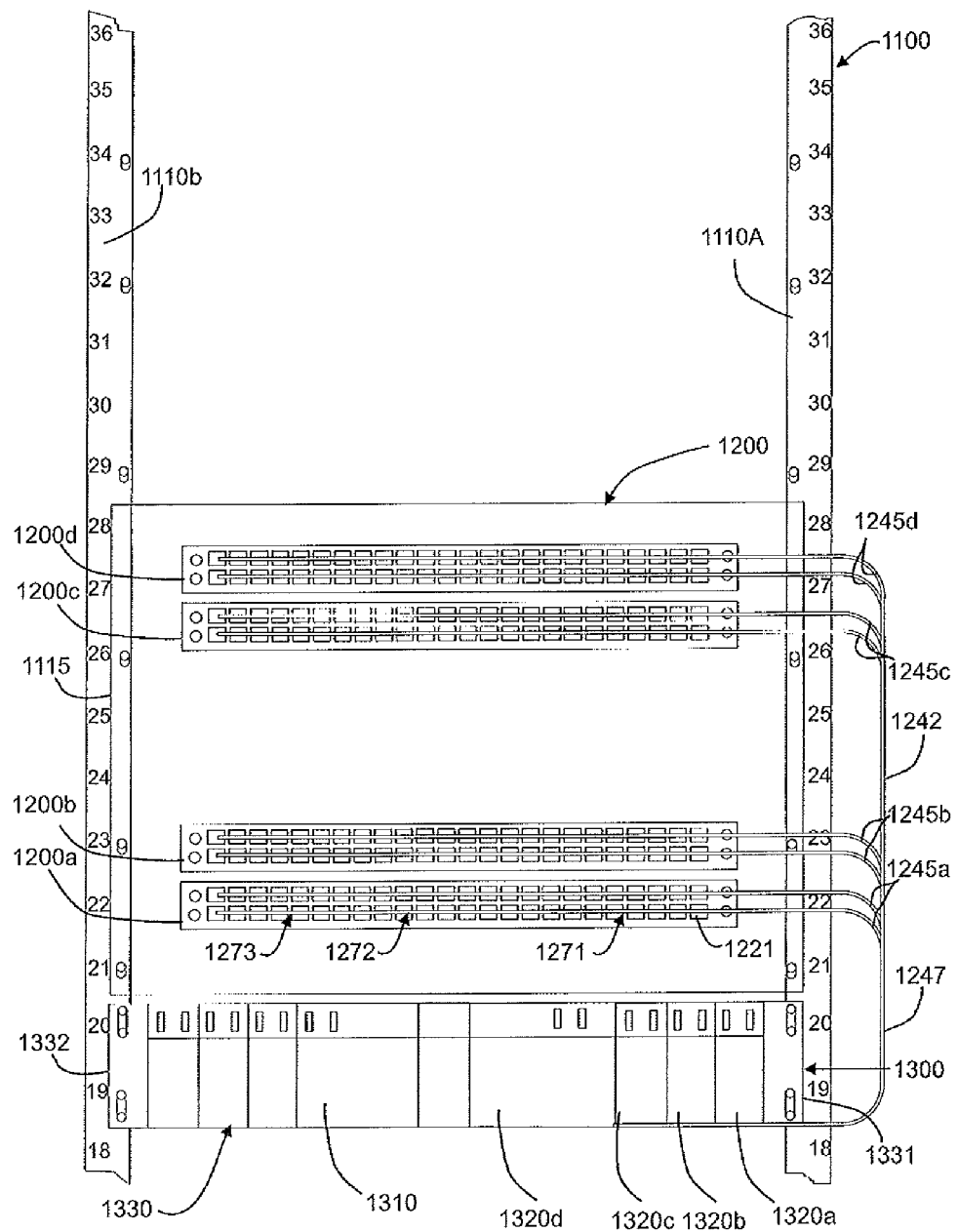
FIG. 6a is a front elevation view of an alternate embodiment of the rack system of the present invention.

The second embodiment of the invention having the hardware blade components mounted in a horizontal orientation will be described with respect to FIGS. 6*a*-10. A rack 1100 is provided, as is known in the data center industry having side rails 1110*a*, 1110*b* formed by metal C-channels and bracket and shelving components mounted between the rails. The rails 1110*a, b* include indicia 1115, such as numeric markings. The partial rack 1100 as shown in FIG. 6*a*, is appropriately 31" tall, however, an additional chassis 1100 may be stacked above chassis 1200 that has at least twice as many blades as the rack depicted in FIG. 6*a*. The chassis 1200 is populated with hardware blade components 1200*a-d*. First hardware blade component 1200*a* has a first side and a second side each having twenty-four ports, the second blade component 1200*b* has a first side and a second side each having twenty-four ports, a third hardware blade component 1200*c* and fourth hardware blade component 1200*d* each have two parallel sides with twenty-four ports each.

Figure 8A:
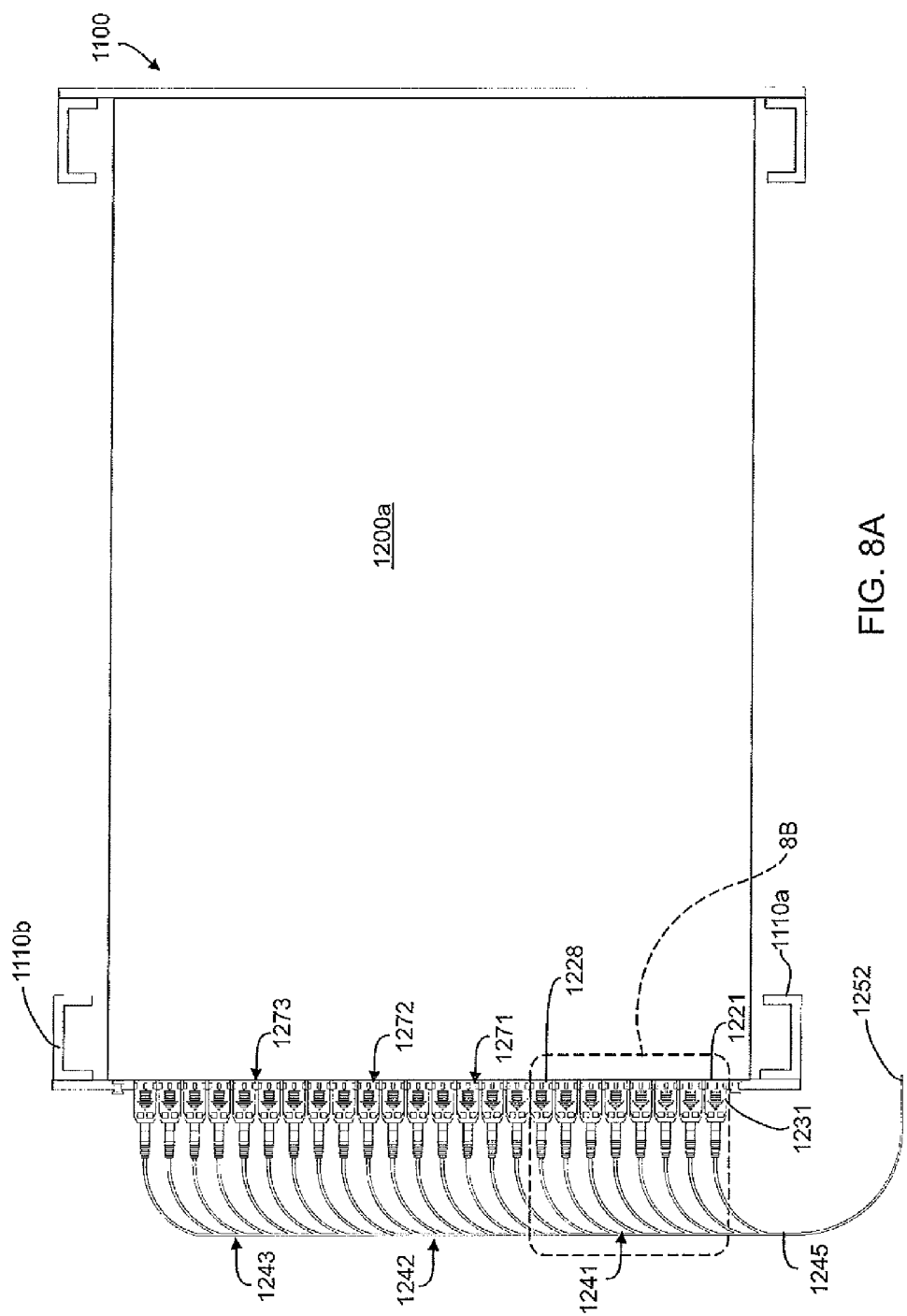
FIG. 8a is a section view taken at line 8a-8a of FIG. 7, depicting the patch panel mounted on the rack of FIG. 7.
Figure 8B:
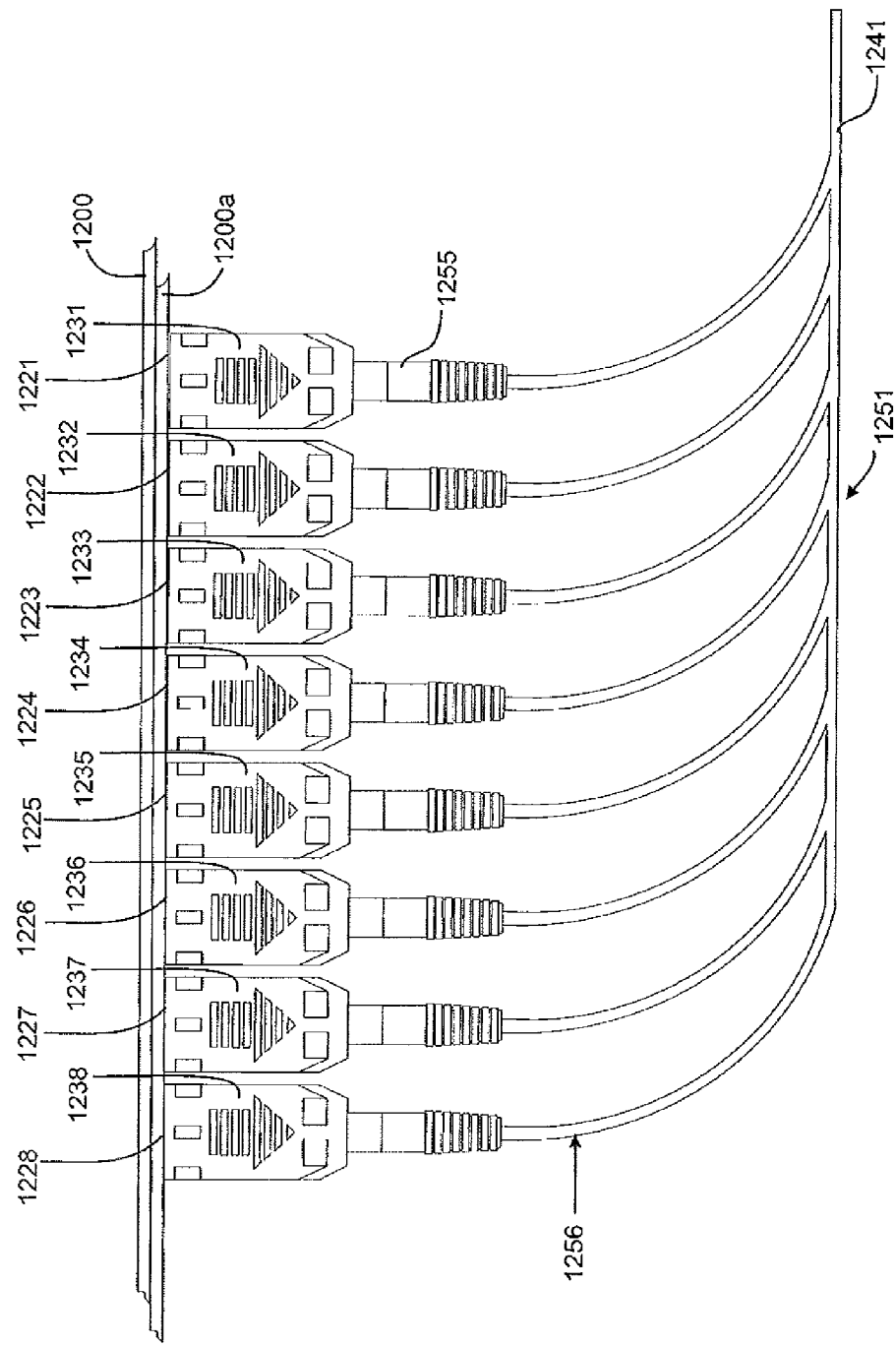

Each of the hardware blade components 1200*a, b, c, d* have twenty-four ports on each side that populate a front end 1215 of each blade component 1200 to provide a total of forty-eight ports per chassis component 1200. Each port 1221 receives a fiber optic connector, such as an individually channeled fiber connector 1231. As depicted in FIG. 8*a*, a first individually channeled fiber connector 1231 is mounted in port 1221 on the front end 1215 of the hardware blade component 1200*a* in a first position. FIG. 8*b* is an enlarged view of the first eight connectors 1231-1238 mounted on the front end 1215 of the hardware blade component 1200*a*. In the embodiment depicted in FIG. 8*b*, the group of eight connectors 1231-1238 and their cabling comprise a cable harness 1241 (similar to the harness 241 depicted in FIG. 3*c*). In alternate embodiments there may be between up to twelve connectors and up to twelve corresponding ports and cables.

In an embodiment, the individual channel fiber optic connector may be an LC type connector such an mSFP-LC Pro-Slide connector. As depicted in FIG. 8*a*, cable harness assemblies 1241, 1242 and 1243 are aligned along the length of the blade 1200*a*, so that a total of twenty-four connectors 1231 are mated to the ports 1221 at the front end 1215 of the hardware blade component 1200*a*. It is to be understood that while the embodiment depicted in these drawings includes eight connectors 1231 in each harness 1241-1243, the present invention may comprise cable harnesses which have more or less connectors in each harness (or more or less harnesses). In addition, it is to be well understood that a hardware component having more or less than forty-eight ports may be accommodated by the present invention and cable harnesses having varying numbers of connectors 1231 and corresponding cables 1256.

It is to be understood that FIG. 8*a* depicts one side of the hardware blade component 1200*a* and only depicts the twenty-four ports 1221 and connectors 1231 running horizontally along the first side of the blade 1200*a* and there are correspondingly twenty-four other ports on the other side of the hardware blade component 1200*a* for receiving an additional twenty-four fiber optic connectors to make a total of forty-eight ports per blade component 1200.

As shown in FIG. 8*b*, the harness 1241 has a first end 1251 including individual fiber cables 1256 attached to each of the eight fiber optic connectors 1231-1238 and a second end 1252 to which a multi-fiber connector 1260 is attached (FIG. 8*a*). The cable harness 1241 has the second end 1252 which is furcated at furcation points in order to provide the eight individual cables at the first end 1251. Finally each individual cable is terminated with a connector 1231-1238. Each connector 1231-1238 may have a boot 1255 (FIG. 8*b*). Each boot 1255 may be numbered 1-8, in order to help the operator to keep the fanned out first end 1251 of the harness 1241 organized.

As can be understood from FIG. 8*b*, the first end 1251 of each individual cable is progressively longer for each cable 1256 corresponding to each connector 1231-1238. For example, the individual cable 1256 at the first end 1251 for the eighth connector 1238 will be approximately about ½" longer than its adjacent connector 1237 etc. It may be understood that the first end 1251 of the individual cable to which the eighth connector 1238 is terminated will be approximately 4" longer than the individual cable at the first end 1251 to which the first connector 1231 is terminated. The staggering of the lengths of the first end 1251 of the fanned out cables on each cable harness 1241-1243 allows for the orderly connection of the harness to each hardware blade component 1200 and eliminates slack and provides for a neat and organized cabling system.

Turning to FIG. 8*a*, the staggered lengths of each of the adjacent cables for the first cable harness 1241 is shown mated to the hardware blade component 1200*a* in a orderly fashion. It may be understood that the individual cable for the first connector 1231 is closer to the second end 1252 of the harness assembly 1241 and therefore can be shorter than the individual cable 1256 for the eighth connector 1228, further along the length of the front end 1215 of the hardware blade component 1200*a*, eight channels away. The first cable harness 1241 has its connectors 1231 mated to the hardware blade component 1200*a* at a first area 1271 having eight ports 1221; the second harness assembly 1242 has its connectors mated to the hardware blade component 1200*a* at a second area 1272 having eight ports; and the third cable harness 1243 has its eight connectors mounted to the hardware blade component 1200*a* at a third area 1273 having eight ports. It may be understood in other embodiments, that the hardware blade component areas 1271, 1272, 1273 may have varying numbers of ports depending on the grouping of the number of connectors 1231 and cables 1256 terminated on each cable harness 1241, 1242, 1243. In addition, hardware blade component areas may by located on the multiple hardware blade components.

Figure 9A:
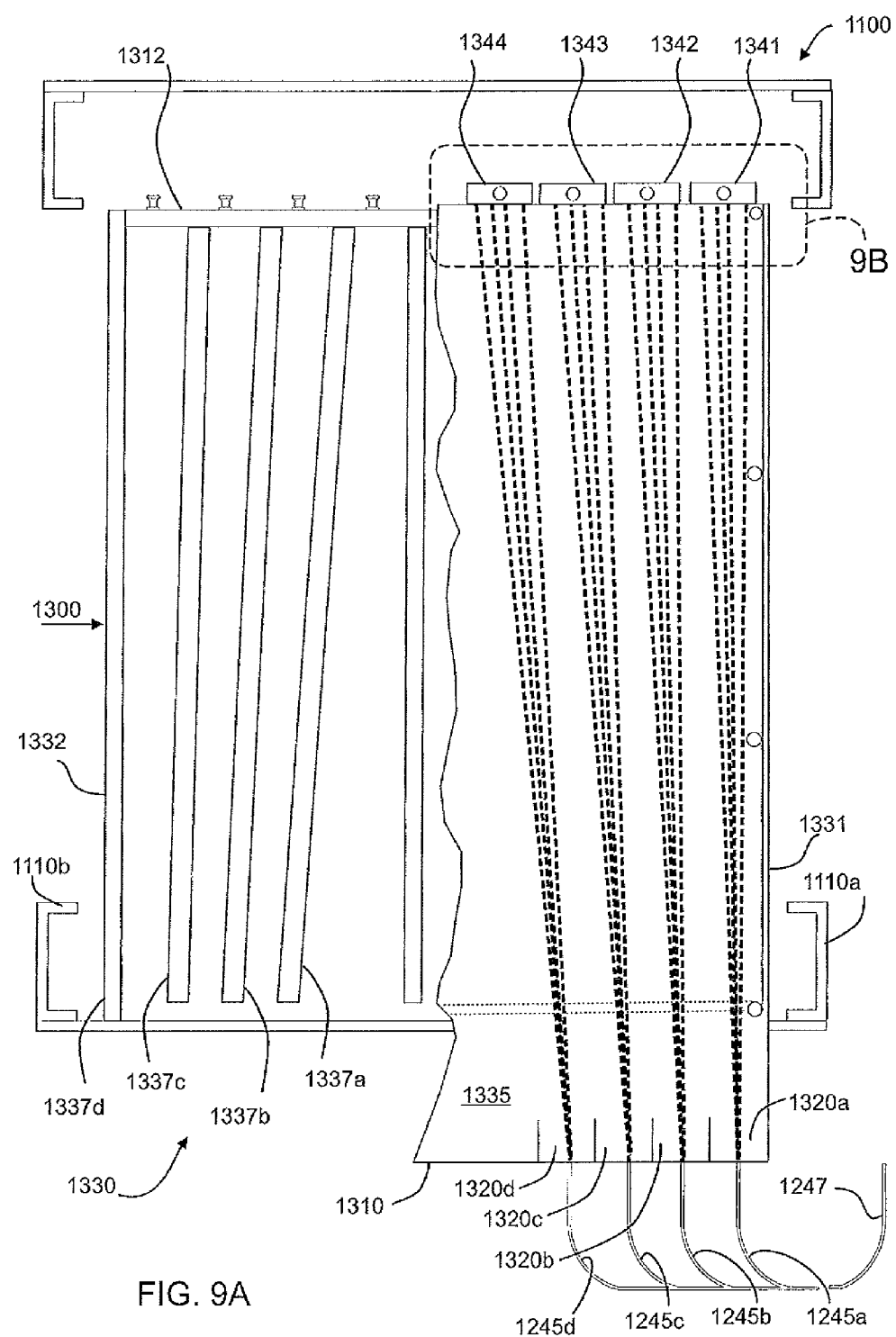
FIG. 9a is a section view taken at line 9a-9a of FIG. 7, depicting the patch panel housing in a partial cut-away view.

Mounted in the rack 1100, is a patch panel housing 1300 having a front end 1310 and rear end 1312 (FIG. 9*a*). The patch panel housing 1300 is mounted in the rack 1100 so that the front end 1310 is adjacent the front end 1215 of each of the hardware blade component 1200*a, b, c, d*. The patch panel housing 1300 includes a first cable pathway opening 1320*a*, a second cable pathway opening 1320*b*, a third cable pathway opening 1320*c* and a fourth cable pathway opening 1320*d* (FIG. 6*a*). Other cable pathway openings 1330 are also provided in the patch panel housing 1300. The first cable pathway opening 1320*a* is the primary position located adjacent the first side 1331 of the patch panel housing 1300.

Figure 7:
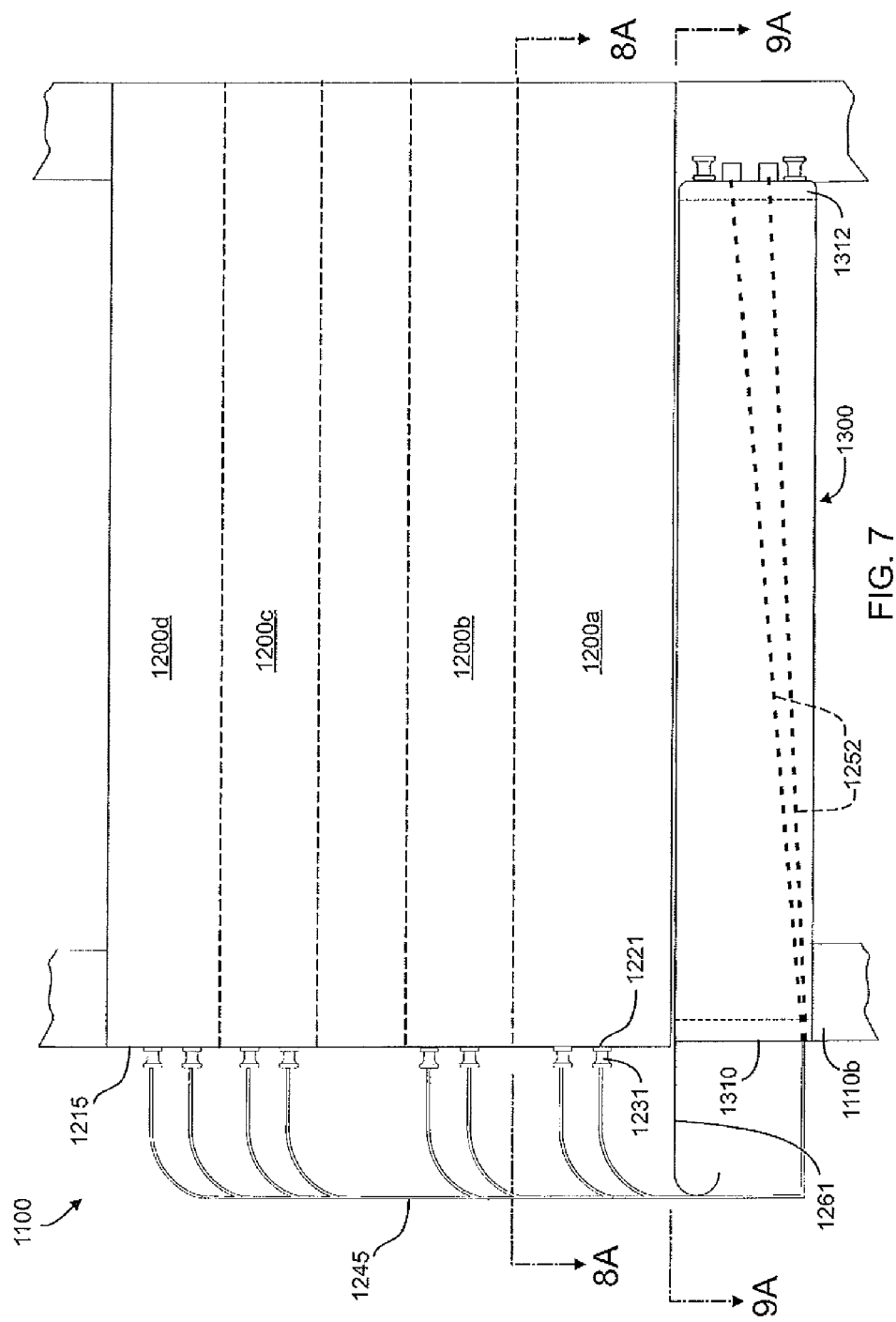

FIG. 9*a* is a section view of the rack 1100 taken at line 9*a*-9*a* of FIG. 7 and depicts a plan view of the patch panel housing 1300 partially broken away. As viewed in FIG. 9*a*, on the right side, the housing cover 1335 is depicted. The housing cover 1335 on the left of the drawing FIG. 9*a* has been removed and depicts the interior of the patch panel housing 1300 exposing a view of the interior walls 1337*a, b, c, d* that provide harness pathways inside the housing 1300. Similar walls 1337 are provided on the other side of the interior of the housing 1300.

Figure 9B:
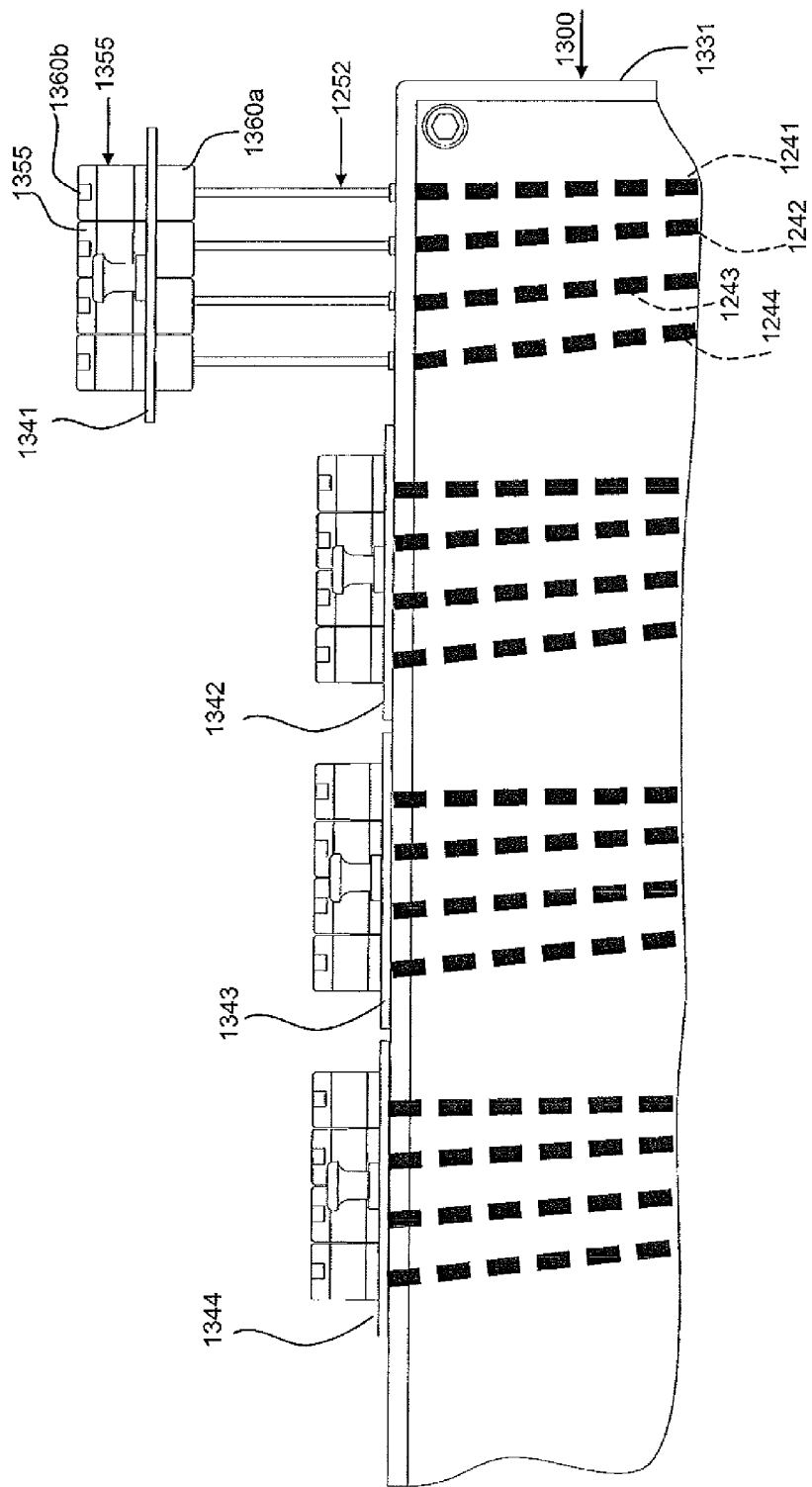
FIG. 9b is an enlarged view of the rear end of the patch panel from an isolated area marked 9b depicted in FIG. 9a and depicting an exploded view of a coupler plate.
Figure 10:
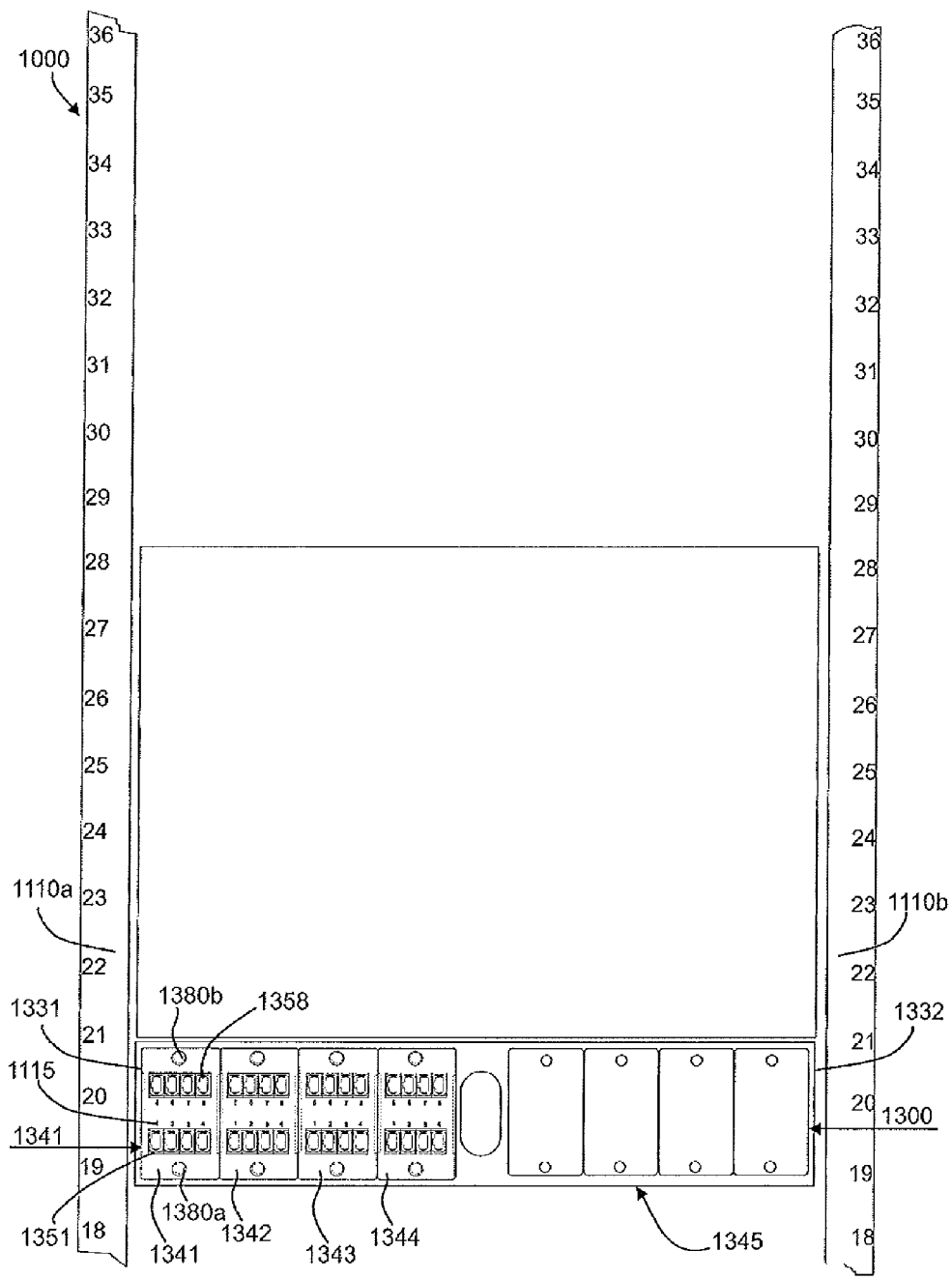

The rear end 1312 of the housing 1300 has mounted thereon a first connector coupler plate 1341, a second connector coupler plate 1342, a third connector coupler plate 1343 and a fourth connector coupler plate 1344 (FIG. 9*b*). Each coupler plate 1341 includes eight coupler connectors 1351-1358 (FIG. 10). Each coupler connector 1351-1358 includes an internal facing side 1360*a* for receiving a multi-fiber connector 1260 and an external facing side 1360*b* (see FIG. 9*b*) for receiving a jumper cable connector (not shown). As depicted in FIG. 9*b*, each coupler connector 1351-1358 has a dust cover mounted thereto. As depicted in FIG. 10, the coupler plate has indicia 1115 provided thereon which identify the positions of the connector couplings 1351-1358. As shown in FIG. 10, numerals 1-8 are provided to designate the positioning of the coupler connectors 1351-1358. Thus it is understood that the primary position is the coupler connector with numeral "1" in the lower left position, (similar to FIG. 4*c*). This is the position in which connector coupler 1351 is mounted on the plate 1341.

To understand the invention further, the steps of mounting and routing the cables on the rack 1100 will be discussed in sequence with respect to FIGS. 6*a*-10. The first cable harness 1241 is arranged so that the first end 1251 has each of the connectors 1231-1238 fanned-out, so that the first connector 1231 may be inserted in the first port 1221 on the first hardware blade component 1200*a* in first position. Each of the next connectors 1232-1238 are likewise mated to its corresponding port 1222-1228 in the first area 271 on the hardware blade component 1200*a*. The second end 1252 of the cable harness 1241 is routed to the right towards the first side of 1100*a* of the rack. The second cable harness 1242 is then arranged so that its first end is fanned-out, so that each of the eight connectors may be mated to the second area 1272 of the hardware blade component 1200*a*. Likewise, the second end 1252 of the second cable harness 1242 is routed to the right to form a cable bundle 1245 with the first harness 1241. The third cable harness 1243 is organized so that the eight connectors at the first end 1250 may be sequentially mated at the third area 1273 on the hardware blade component 1200*a*. The second end 1252 of the third cable harness 1243 is routed to the right to form a cable bundle 1245 with the first and second harnesses 1241, 1242 at first side 1110*a* of the rack 1100.

Thus, it is understood that each of the second ends 1252 of the cable harnesses 1241, 1242 and 1243 are each gathered lying side by side in a horizontal orientation as shown in FIGS. 6*a, b*, 8*a* to form a first bundle 1245*a*. In the embodiment depicted in FIG. 6*a, b*, the first cable harness bundle 1245*a* is secured using hook and loop straps 1401. The cable harness bundles 1245*a, b, c, d* will have a total length between 45" and 90". The length of the cable harness may vary depending on the specific hardware component and port configuration. Thus, it may be understood that when the second ends 1252 of each of the cable harness bundles 1245 a, b, c, d are routed to the first side 1110*a* of the rack 1100 and the bundle 1245*a* bends at approximately a radiused 90° bend downward along the side rail 1110*a*. The first cable bundle 1245*a* joins with second, third and fourth cable bundles 1245 b, c, d to form a major cable bundle 1247 that runs vertically down the side rail 1110*a* toward the bottom of the rack 1100. While FIG. 6*b* attempts to illustrate all visible individual cables, FIG. 6*a* is schematic with respect to the cables and a single line 1247 is representative of a bundle of cables.

Figure 6B:
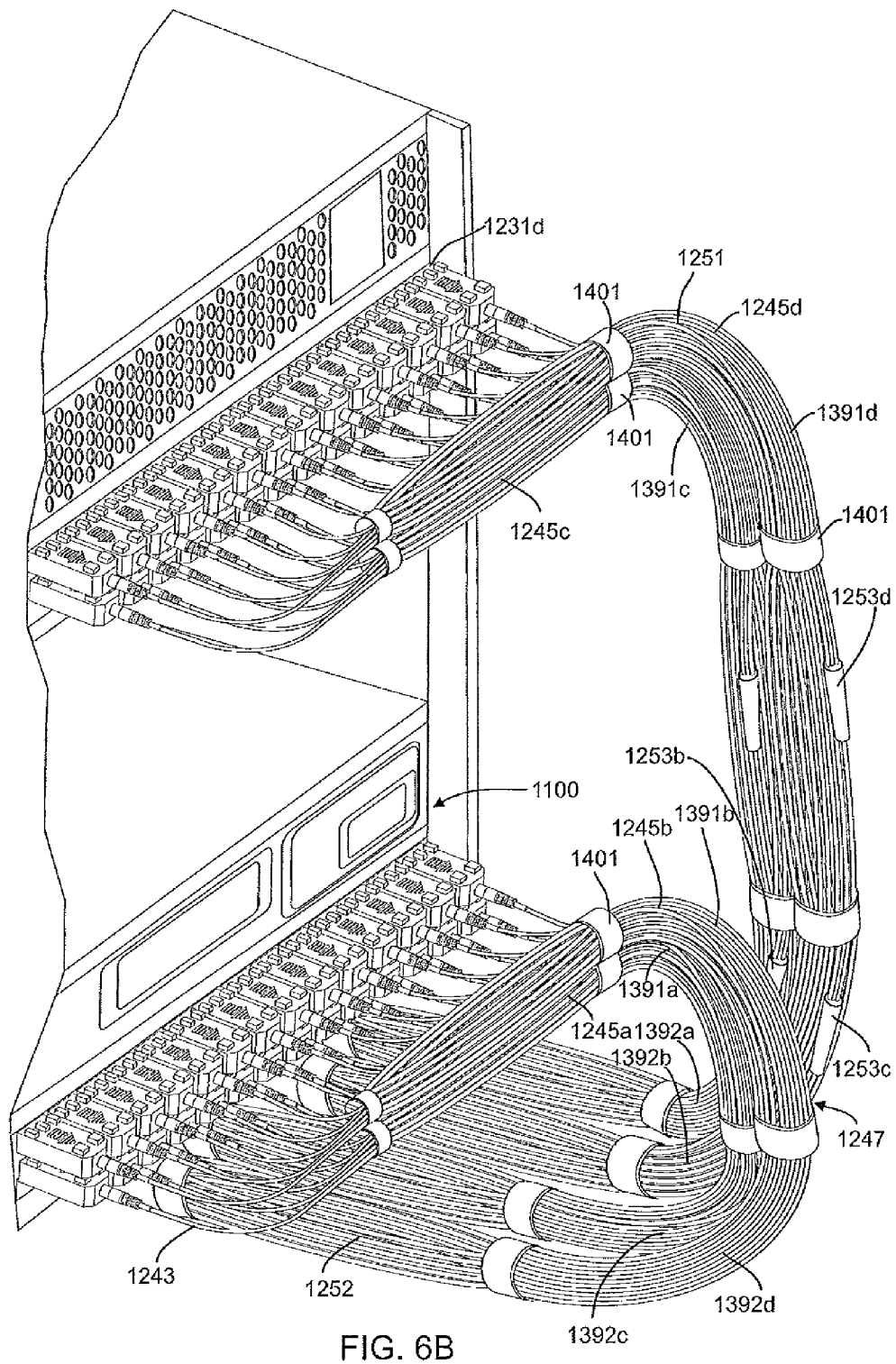

Each of the second, third and fourth cable bundles 1245*b, c d* are formed in the same manner as discussed above. In other words, in the embodiment depicted in FIGS. 6*a, b* each cable bundle 1245*b, c d* includes three cable harness that each include eight individual cables terminated with individually channeled fiber connectors 1221-1228 connected to other areas on hardware blade component sides 1200*b, c* d. So in the embodiment depicted in FIGS. 6*a, b* each cable bundle 1245 will be made up of twenty-four individual cables. Each cable harness has its individual cables furcated to form the second end 1252 at furcation points 1253*b, c, d* (FIG. 6*b*). Because the length of each cable bundle 1245*a, b, c, d* (and each harness 1241-1243 therein) is progressively longer (as each component 1200*a, b, c, d* is progressively further from the patch panel 1300) each of the multi-fiber connectors 1260 will be side-by-side.

Each of the second ends 1252 of the cable harnesses 1245*a, b, c, d* are routed downward along the side rail 1110*a* and may be secured with a cable management. The major bundle 1247 makes a bend of approximately 90° to route each cable bundle 1245*a, b, c, d* to the front end 1310 of the patch panel 1300 for routing the bundles through the cable pathway openings 1320 at the front end 1310 of the patch panel housing 1300. A Crimmins tool may by used to pull each group of multi-fiber connectors 1260 from the front end 1310 to the rear end 1312 of the patch panel housing 1300.

In a preferred embodiment, the first cable bundle 1245*a* is routed through the first cable pathway opening 1320*a* and the multi-fiber connectors 1260 terminated on the first coupler plate 1341 positioned at the first side 1331 (FIG. 9*a*). Then the second end 1252 of the second cable bundle 1245*b* is routed through the second cable pathway opening 1320*b* and its multi-fiber connectors 1260 are terminated at the second coupler plate 1342 adjacent the primary position where the first cable harness bundle 1245*a* has its connectors 1260 terminated to coupler connector 1351-1353. Then the second end 1252 of the third cable bundle 1245c is routed through the third cable pathway opening 1320c and its connectors 1260 mated to the third coupler plate 1343. Finally, the second end 1252 of a fourth cable bundle 1245d is routed through the fourth cable pathway opening 1320d and its multi-fiber connectors 1260 are mated to the fourth coupler plate 1344.

As depicted in FIG. 9b, it is preferable to remove the coupler plate 1341 from the rear end 1312 of the patch panel housing 1300 to attach the multi-fiber connectors 1260 to its corresponding coupler connector 1351-1358. Once each of the connectors 1260 are mated to the coupler plate 1341 the plate is mounted to the rear end 1312 of the housing 1300 via snap fit fasteners 1380a, 1380b (FIG. 10). According to the orientation of the preferred embodiment of the hardware blade components 1200 having twenty-four channels on a single side 1200a; the use of only four cable bundles 1245a, b, c, d are necessary coming from the four hardware blade components 1200a, b, c, d. In that instance, a cable bundle is routed through the first, second, third and fourth cable pathway openings 1320a, b, c, d.

However, it is to be understood that a hardware blade component 1200 and having more channels will require additional cable harnesses and cable bundles and in that instance there are additional cable pathway openings 1330 (FIGS. 6a, 9a) to accommodate additional multi-fiber connectors 1260 that are routed from the additional cable bundles. Also in a taller rack 1100, there may be other hardware blade components mounted above the blade 1200d, so that the cable bundles from the upper most blades may also be routed to the first side rail 1110a and drop down vertically to join the major bundle 1247 and be routed through the cable pathway openings 1330 moving from right to left (as shown in FIG. 6a) and its connectors 1260 terminated on remaining coupler plates 1341-44 (FIG. 10).

In assembling the cables to the rack 1100, each of the cable bundles 1245a, b, c, d has a first radiused 90° bend 1391a, b, c, d when the first ends 1251 are routed from the front end 1215 of each of the hardware blade components and a second radiused 90° bend 1392a-d when the second end 1252 of each bundle is routed into the channel openings 1320 a, b, c, d. The routing of the second ends 1252 of the cable bundles from the front end 1310 to the rear end 1312 of the patch panel housing 1300 is done in a straight line, so that there are no bends in the cable bundle. Since the length of the second ends 1252 are carefully tailored to the size of the patch panel housing 1300 and with respect to the orientation on the rack with relation to each of the hardware blade components populated thereon, there is little slack and minimum bending of the cable bundles on the rack 1100.

Also due to the structured orientation of the cabling bundles 1245 and harnesses 1241-1244 from the hardware components 1200 where first cable bundle 1245a is routed to the first cable pathway opening numbered "1" and the second cable bundle 1245b routed to the second cable pathway opening numbered "2" etc. to provide a sequential orientation, there is little slack in each of the cable harnesses 1241-1244 and cable bundles 1245a, b, c, d and which provides for an organized and orderly rack cabling system. The orderly and organized system as described above also allow for a more rapid assembly of the cables 1241-1244 and cable bundles 1245a, b, c, d to the rack system 1100.

As well, due to the minimal bends of the cable bundles 1245a, b, c, d the fiber optic cables are well maintained, have increased longevity and maintain high performance. Finally, due to the organizational structure of the patch panel housing 1300 having each of the separated cable pathway openings 1320, divider walls 1337 and the housings orientation where the cable pathway openings 1320 are oriented at the front end 1310 being adjacent to the front end 1215 of the hardware blade component 1200a, c and terminating at the rear end 1312, provides for a patch panel housing 1300 that takes up a minimal amount of space. For example, as depicted in FIG. 6a, it can be seen that the patch panel housing 1300 takes a two RU space.

What is claimed is:

1. A rack cabling system comprising:
a rack having mounted thereon a first hardware component and a patch panel housing mounted on the rack adjacent the first hardware component, the patch panel housing populating no more than a three rack unit (RU) space, the patch panel housing including a front end having cable pathway openings and a rear end having connector coupler plates mounted therein, the patch panel housing mounted in the rack so that its front end is aligned with a front end of the first hardware component,
the cable pathway openings arranged within the patch panel housing between a first side and second side of the housing, the patch panel having a first cable pathway opening located adjacent the first side of the housing and defining a primary position and a first connector coupler plate mounted on the rear end adjacent the first side and the first connector plate having a first position corresponding to the primary position of the first cable pathway opening and a second position adjacent the first position;
the first hardware component having a first cable harness extending therefrom, each harness including a group of individually channeled fiber connectors terminated on a group of cables at a first end of the harness and a multi-fiber connector at an opposite second end of the harness, the group of cables at the first end each having differing lengths and each cable being progressively longer with respect to an adjacent cable at the first end of the harness, each hardware component having at least a first and second cable harness extending therefrom, the first hardware component having a first and second area for connecting the first end of each cable harness;
the first cable harness having its first end mounted to the first hardware component in the first area on the hardware component and the second end received in the primary position of the patch panel so that the first cable harness is routed with three bends or less of the cables from the first hardware component into the first cable pathway opening and extending without a bend through the patch panel housing to the rear end so that the multi-fiber connector is terminated at the first connector coupler plate in the first position;
the second cable harness is routed with three bends or less of the cables from the second area of the hardware component into the cable pathway opening of the patch panel and extending without a bend through the patch panel housing to the rear end so that the multi-fiber connector is terminated at the second position of the connector coupler plate off-set from the first position and the length of each of the cables comprising the second cable harness being longer than each of the cables comprising the first cable harness wherein a minimum amount of slack is provided in each of the first and second cable harnesses.

2. The rack cabling system of claim 1, wherein the patch panel includes at least eight cable pathway openings and each opening numbered sequentially 1 through 8.

3. The rack cabling system of claim 1, wherein the patch panel includes up to eight connector coupler plates.

4. The rack cabling system of claim 3, wherein the connector coupler plate includes up to eight couplers on each plate and each coupler numbered sequentially beginning with 1 through 8.

5. The rack cabling system of claim 4, wherein the second cable harness multi-fiber connector is terminated in the second position at a coupler numbered "2".

6. The rack cabling system of claim 1, wherein each of the first and second cable harnesses including the first end having up to twelve individually channeled LC type connectors terminated on up to twelve individual cables forming the group of cables at the first end and each harnesses including the second end having up to twelve individual cables joined to form a multi-fiber cable terminated with an MTP type connector and the multi-fiber cable furcated to provide up to twelve individual cables at the first end of the harness.

7. The rack cabling system of claim 6, wherein the LC type connector comprises an LC or mSFP-LC pro-slide connector.

8. The rack cabling system of claim 6, wherein the first and second area of the hardware component each including up to twelve fiber optic connectors for mating with the six to twelve individually channeled LC type connectors at the first end of the cable harness.

9. The rack cabling system of claim 6, wherein at least four cable harnesses are routed from each hardware component and each cable harness having a length of approximately 36", 42", 48" and 54", respectively and the first end of each harness having up to twelve individual cables staggered by a difference in length of approximately ½" connector to connector with a tolerance range of ¼" to 1".

10. The rack cabling system of claim 1, wherein the bend of the first and second cable harness comprises a change in direction of the second end of the harness of more than five degrees and any continuous arc of the cable comprising a single bend until the cable runs in a straight path for at least three inches and then changes direction to begin a second bend.

11. The rack cabling system of claim 1, wherein the rack includes trunk cables attached the couplers on coupler plates on the patch panel housing and a horizontal trunk management bar attached to the rack for managing the trunk cables.

12. The rack cabling system of claim 1, wherein the rack includes a second hardware component, each of the first and second hardware components being mounted in a vertical orientation within the rack.

13. The rack cabling system of claim 12, wherein each of the first and second cable harnesses extend downward from the first hardware component and the second end of each cable harness forming approximately a radiused 90° bend in order to enter the front end of the patch panel housing so that the first and second cable harnesses are received in the first cable pathway opening numbered "1".

14. The rack cabling system of claim 1, wherein the rack includes a second hardware component, each of the first and second hardware components being mounted in a horizontal orientation within the rack.

15. The rack cabling system of claim 14, wherein each of the first and second cable harnesses extend sideways from the first hardware component toward a first side of the rack;
 a third cable harness extends from the second hardware component sideways toward the first side of the rack, the third cable harness having a first and second end;
 each of the first ends of the first, second and third cable harnesses forming approximately a radiused 90° bend in order to extend downward along the first side of the rack; and the second end of each of the first, second and third cable harnesses forming approximately a radiused 90° bend in order to enter the front end of the patch panel housing so that the first and second cable harnesses are received in the first cable pathway opening numbered "1" and the third cable harness is received in a second cable pathway opening numbered "2".

16. The rack cabling system of claim 1, wherein the first hardware component is one of a switch, router, director, data management tool and server.

17. A rack cabling system comprising:
 a rack having mounted thereon a first hardware component and second hardware component, a patch panel housing mounted on the rack adjacent the first hardware component, the patch panel housing populating no more than a three rack unit (RU) space, the patch panel housing having a front end having cable pathway openings and a rear end having connector coupler plates mounted therein, the patch panel housing mounted in the rack so that its front end is aligned with a front end of the first and second hardware components;
 the cable pathway openings arranged within the patch panel housing between a first side and second side of the housing, the patch panel having a first cable pathway opening located adjacent the first side of the housing and defining a primary position and a first connector coupler plate mounted on the rear end adjacent the first side and being in the primary position corresponding to the first cable pathway opening and the patch panel housing having a second cable pathway opening;
 the first hardware component having a first cable harness bundle extending therefrom, the second hardware component having a second cable harness bundle extending therefrom, each of the first and second cable harness bundles having at least two harnesses each comprising a group of individually channeled fiber connectors terminated on a group of cables at a first end and a multi-fiber connector at an opposite second end,
 the first cable harness bundle having its first end mounted to the first hardware component and the second ends received in the primary position of the patch panel so that the first cable harness bundle is routed with three bends or less of the cables from the first hardware component into the first cable pathway opening and extending without a bend through the patch panel housing to the rear end so that the multi-fiber connectors are terminated at the first connector coupler plate;
 the second cable harness bundle is routed with three bends or less of the cables from the second hardware component into the second cable pathway opening offset from the primary position of the patch panel and extending without a bend through the patch panel housing to the rear end so that the multi-fiber connectors are terminated at a second connector coupler plate off-set from the primary position and the length of each of the cables comprising the second cable harness bundle being longer than each of the cables comprising the first cable harness bundle wherein a minimum amount of slack is provided in each of the first and second cable harness bundles.

18. The rack cabling system of claim 17, wherein each of the first and second hardware components being mounted in a horizontal orientation within the rack.

19. The rack cabling system of claim 18, wherein each of the first and second cable harness bundles extend sideways from the first and second hardware component, respectively toward a first side of the rack and each of the first ends of the first and second cable harness bundles forming approximately a radiused 90° bend in order to extend downward along the first side of the rack and the second end of each of the first and second cable harness bundles forming approximately a radiused 90° bend in order to enter the front end of the patch panel housing so that the first cable harness bundle is received in the first cable pathway opening numbered "1" and the second cable harness bundle is received in a second cable pathway opening numbered "2".

20. The rack cabling system of claim 17, wherein the first cable harness bundle comprises at least six individual cables having six individually channeled fiber connectors at a first end extending from a first area of the first hardware component and a second end from which the six individual cables are furcated; and the second cable harness bundle comprises at least six individual cables having six individually channeled fiber connectors at a first end extending from a first area of the second hardware component and a second end from which the six individual cables are furcated.

21. The rack cabling system of claim 20, wherein the first cable bundle further comprises at least eight individual cables having eight individually channeled fiber connectors at a first end extending from a second area of the first hardware component and a second end from which the eight individual cables are furcated; and the second cable harness bundle further comprises at least eight individual cables having eight individually channeled fiber connectors at a first end extending from a second area of the second hardware component and a second end from which the eight individual cables are furcated.

22. A method of assembling cabling for rack of hardware components comprising the steps of:

assembling a rack having first and second hardware components;

preparing no more than a three rack unit (RU) space on the rack and mounting a patch panel housing thereto, the patch panel housing having a front end having a cable pathway opening and a rear end having connector coupler plates, orienting the patch panel housing on the rack so that the front end is aligned with a front end of the first hardware component and a primary position of the cable pathway opening in accordance with the position of the first hardware component;

attaching a first end of a first cable harness to the first hardware component;

routing a second end of the first cable harness to the cable pathway opening of the patch panel housing with three or less bends of the first cable harness;

routing the second end of the first cable harness through the patch panel housing to the rear end;

terminating the second end of the first cable harness at the coupler plate, attaching a first end of a second cable harness to the second hardware component;

routing a second end of the second cable harness to the cable pathway opening of the patch panel housing with three or less bends of the second cable harness;

routing the second end of the second cable harness through the patch panel housing to the rear end in a position adjacent to the primary position; and terminating the second end of the second cable harness at a second coupler plate.

23. The method of claim 22, further comprising the steps of:

providing a patch panel housing front end that includes two sets of routing indicia for prioritizing placement of the first and second cable harnesses and a first set of routing indicia provided in a first color and a second set of routing indicia in a second color and each of the first and second routing indicia indicating a primary position and wherein the first set of routing indicia corresponds with a rack system having the hardware component mounted vertically and the second set of routing indicia corresponds with a rack system having the hardware component mounted horizontally;

identifying the first set of routing indicia corresponding to a present orientation of the hardware component; and routing the first and second cable harnesses through the patch panel housing front end in the primary position according to one of the first and second routing indicia.

* * * * *